(12) United States Patent
Nakajima et al.

(10) Patent No.: US 6,616,262 B2
(45) Date of Patent: Sep. 9, 2003

(54) IMAGE PROCESSING APPARATUS PERFORMING PRINTER CALIBRATION

(75) Inventors: Nobuyuki Nakajima, Kanagawa (JP); Masakazu Tsuchiya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/923,992

(22) Filed: Aug. 8, 2001

(65) Prior Publication Data

US 2002/0021321 A1 Feb. 21, 2002

(30) Foreign Application Priority Data

Aug. 11, 2000 (JP) .................................. 2000-245391
Dec. 19, 2000 (JP) .................................. 2000-385785

(51) Int. Cl.⁷ ........................... B41J 29/393; B41J 29/38
(52) U.S. Cl. ........................................ 347/19; 347/14
(58) Field of Search ........................ 347/19, 14, 10, 347/11, 12, 15, 23, 16, 17, 20, 5, 6, 41, 42, 43; 358/504

(56) References Cited

U.S. PATENT DOCUMENTS 5,038,208 A * 8/1991 Ichikawa et al. ............. 358/75
5,477,245 A * 12/1995 Fuse ............................ 347/10

* cited by examiner

Primary Examiner—Judy Nguyen
Assistant Examiner—Charles W. Stewart, Jr.
(74) Attorney, Agent, or Firm—Fitzpatrick, Cella, Harper & Scinto

(57) ABSTRACT

A method of controlling an image processing condition comprises: a first step of inputting a first test image on a recording sheet, and performing first calibration that determines an image processing condition based on a density of the first test image; a second step of automatically forming a second test image, measuring a density thereof, and performing second calibration that determines the image processing condition based on the measured density, a third step of receiving the image processing condition, calibrating the received condition and an engine characteristic at first calibration time, and storing a calibrated result, and a fourth step of correcting, at the second calibration and the image processing condition storage, the stored condition based on the calibrated and stored engine characteristic and the measured engine characteristic. Thus, a printing characteristic can be stabilized as a user's load is reduced by combining plural calibrations.

23 Claims, 31 Drawing Sheets

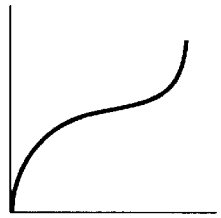
FIG. 5A
ADJUST C, M, Y, K MAX
DENSITIES AND OBTAIN
ENGINE CHARACTERISTIC
FIG. 5B
CALIBRATION
CORRECTION DATA=
CURRENT ENGINE
CHARACTERISTIC−
ONE-PREVIOUS ENGINE
CHARACTERISTIC
 MERGE 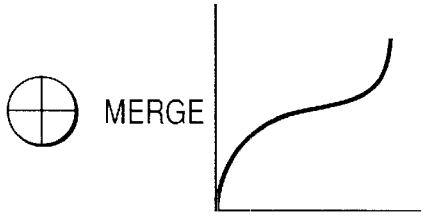
FIG. 5C
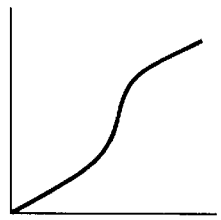
FIG. 5D

| ARRANGEMENT | ACTUAL OUTPUT DATA |
|---|---|
| 0 | 0 |
| 1 | 4 |
| 2 | 8 |
| 3 | 12 |
| 4 | 16 |
| 5 | 20 |
| 6 | 24 |
| 7 | 28 |
| 8 | 32 |
| 9 | 36 |
| 10 | 40 |
| 11 | 44 |
| 12 | 48 |
| 13 | 52 |
| 14 | 56 |
| 15 | 60 |
| 16 | 64 |
| 17 | 68 |
| 18 | 72 |
| 19 | 76 |
| 20 | 80 |
| 21 | 84 |
| 22 | 88 |
| 23 | 92 |
| 24 | 96 |
| 25 | 100 |
| 26 | 104 |
| 27 | 108 |
| 28 | 112 |
| 29 | 116 |
| 30 | 120 |
| 31 | 124 |
| 32 | 128 |
| 33 | 132 |
| 34 | 136 |
| 35 | 140 |
| 36 | 144 |
| 37 | 148 |
| 38 | 152 |
| 39 | 156 |
| 40 | 160 |
| 41 | 164 |
| 42 | 168 |
| 43 | 172 |
| 44 | 176 |
| 45 | 180 |
| 46 | 184 |
| 47 | 188 |
| 48 | 192 |
| 49 | 196 |
| 50 | 200 |
| 51 | 204 |
| 52 | 208 |
| 53 | 212 |
| 54 | 216 |
| 55 | 220 |
| 56 | 224 |
| 57 | 228 |
| 58 | 232 |
| 59 | 236 |
| 60 | 240 |
| 61 | 244 |
| 62 | 248 |
| 63 | 255 |

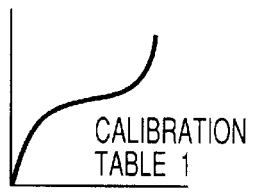
FIG. 16A
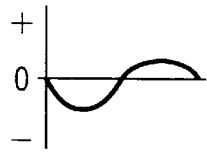
FIG. 16B
 
FIG. 16C
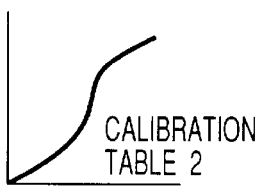
FIG. 16D

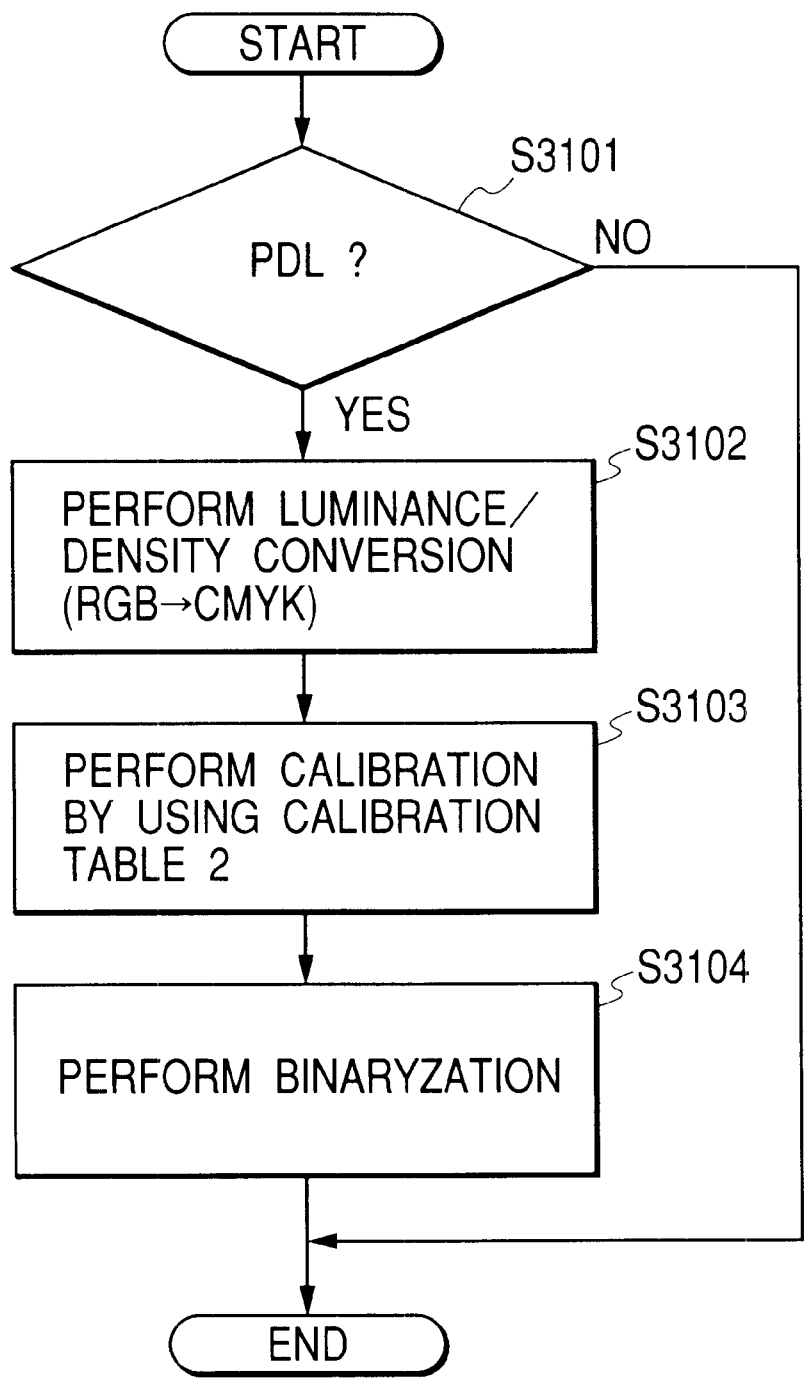

IMAGE PROCESSING APPARATUS PERFORMING PRINTER CALIBRATION

BACKGROUND OF THE INVENTION

1. Field of the Invention

The present invention relates to calibration for gradation correction of a color printer.

2. Related Background Art

In general, in a case where color printing is performed by a color printer connected to a PC (personal computer), a printing characteristic of the color printer changes as time passes, a printed result might resultingly change. Such a change of the printing characteristic is generally called a successive change. The successive change occurs in accordance with temperature, humidity, the reminder of toner being a printing agent, a use frequency of a photosensitive drum, and the like.

As a result, in a case where printing data generated based on a printer characteristic at a certain time is subjected to printing at another time, the printed result of proper color can not occasionally be obtained.

Further, even in a case where plural printers of the same type are used, an individual difference occurs in the printing characteristic between, e.g., a printer A and a printer B because of the above reason, whereby the printed result by the printer A might be different from the printed result by the printer B.

In order to solve such problems, calibration that the printing characteristics of the printers are measured and, e.g., a gradation correction condition is thus rectified (or corrected) is performed.

As an example of the conventional calibration, there is calibration between an engine and a controller which together constitute the printer.

This conventional calibration is automatically performed within the printer irrespective of an instruction by a user or a host computer. Such a process is called device calibration hereinafter. In the device calibration, a latent image for each of C (cyan), M (magenta), Y (yellow) and K (black) is formed on the photosensitive drum, potentials of the formed latent images are measured to obtain the printing characteristic, and the gradation correction condition is thus rectified. It should be noted that, in the device calibration, instead of the latent image formed on the photosensitive drum, the printing characteristic is occasionally obtained by measuring a density of a toner image formed by developing the latent image with toner.

By the above device calibration, the calibration is regularly performed without troubling the user.

However, in the device calibration, characteristics of sensors themselves using the calibration are relatively dispersed, whereby there is no accuracy necessary to be able to ensure the absolute density value by which the individual difference between the printers is excluded. Namely, it is possible to stabilize a relative density characteristic being a density characteristic peculiar to each printer, by suppressing a change in the characteristic due to factors such as temperature, humidity and the like which the change may occur in the printer. However, it is difficult to obtain and stabilize an absolute density characteristic.

On the other hand, one calibration method is disclosed in Japanese Patent Laid-Open Application No. 2000-318266. This is the calibration which is performed, through a user's operation, between a computer and a color printer together constituting a system. Namely, in response to an instruction from a computer, a patch for measurement is formed on a sheet by the color printer, the sheet is read by a scanner, calibration data is generated by the computer on the basis of patch data read from the sheet, and the generated calibration data is downloaded to the printer. Such a process is called soft calibration. The soft calibration can achieve higher-accurate patch measurement as compared with the device calibration, whereby it is possible to stabilize the absolute density characteristic and greatly reduce the dispersion in the printing characteristics among the plural printers. It should be noted that, in the soft calibration, since the user's operation is necessary to cause the scanner to read the created patch, a load is put to the user.

Incidentally, there are following problems in the above conventional calibration technique.

Namely, in one of the above two kinds of calibrations, the relative density characteristic can be stabilized, and in the other thereof, the absolute density characteristic can be stabilized. In other words, each calibration has the different merit and demerit. Since these two calibrations respectively function independently, they did not conventionally function with a correlation mutually. Thus, for example, even:if the soft calibration is performed at certain timing to adjust the printing characteristic, the adjusted printing characteristic changes due to the device calibration occurred at predetermined timing, whereby the absolute density characteristic based on the soft calibration may not be maintained. Therefore, in order to obtain the stabilized printed result at any time, the soft calibration to which the user's operation is-necessary must be performed frequently.

Further, the printing using the above calibration data is limited to a case of a PDL (page description language) mode where the above image process is performed in a printer controller. Namely, in a so-called image mode that all image processes including rasterizing and binarization are performed on a client computer connected to a conventional printing system, the image process which uses the above calibration data can not be achieved.

On the other hand, although the image process using the calibration data can be performed in the PDL mode, the image process using the calibration data can not be performed in the image mode, whereby there is the drawback that a tint of a printed image output in the PDL mode is different from a tint of a printed image output in the image mode.

SUMMARY OF THE INVENTION

An object of the present invention is to provide an image processing apparatus and a calibration method which solved the above problems.

Another object of the present invention is to provide an image processing apparatus and a calibration method which can stabilize a printing characteristic as reducing a user's load by appropriately combining plural calibrations respectively having different merits.

Still another object of the present invention is to provide an image processing apparatus and a calibration method which can obtain a stabilized printing characteristic in any mode by providing even in an image mode a structure of performing calibration same as that in a PDL mode.

Still another object of the present invention is to provide an image processing apparatus and a calibration method which can reduce a load to a network by reducing as much as possible information necessary in the image mode, and can also reduce a load to a process of creating a calibration table in the image mode by obtaining the calibration table itself.

Other objects and features of the present invention will be clarified through the following description in the specification and the attached drawings.

BRIEF DESCRIPTION OF THE DRAWINGS

FIGS. 5A, 5B, 5C and 5D are diagrams showing the details of the calibration data correction process;

FIG. 6 is a diagram showing an example of patch data used in the printer calibration system;

FIG. 10 is a diagram showing relation between values representing patch data arrangement positions of FIG. 6 and output data;

FIGS. 16A, 16B 16C and 16D are diagrams showing a concept of calibration data generation;

FIG. 31 is a flow chart showing an image process in the printer according to the fifth embodiment;

DESCRIPTION OF THE PREFERRED EMBODIMENTS

Hereinafter, the embodiments of the present invention will be explained in detail with reference to the attached drawings.

It should be noted that, in each of the embodiments explained hereafter, although a color LBP (laser beam printer) is used as an example of a printer constituting a system, it is needless to say that the present invention is similarly applicable to another printer such as a: color inkjet printer or the like.

First Embodiment

A printer calibration system according to the present embodiment is the system which stabilizes a printing characteristic of an arbitrary color printer in a system which includes computers, scanners, color printers and the like connected on a network. Further, this printer calibration system achieves higher-accurate calibration by appropriately combining later-described two kinds of calibrations.

Figure 1:
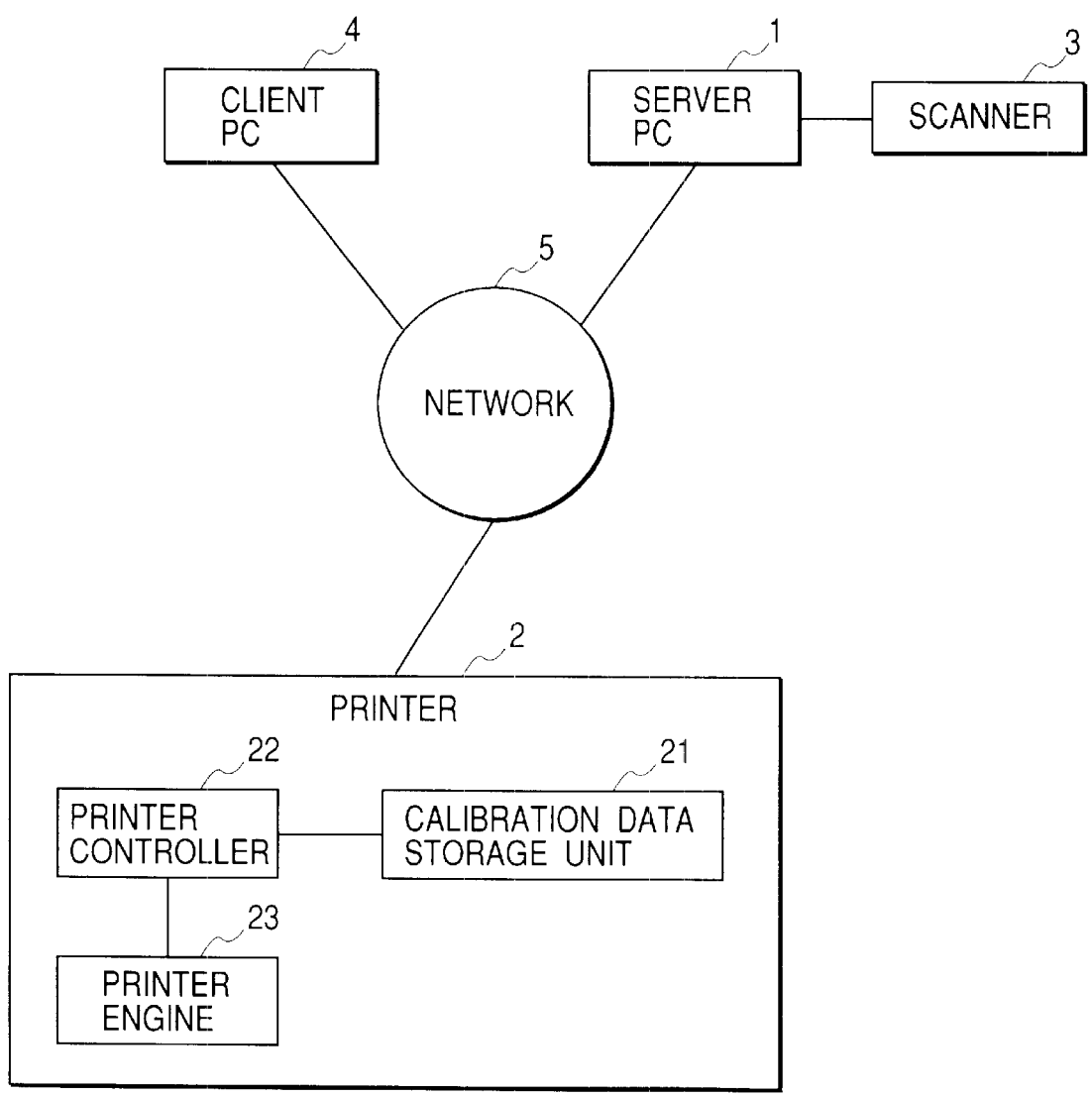
FIG. 1 is a block diagram showing an example of a structure of: a printer calibration system according to the first embodiment.

FIG. 1 is a block diagram showing an information processing system according to the first embodiment of the present invention. In this system, the two kinds of calibrations are performed respectively to calibrate the printer.

In FIG. 1, numeral 1 denotes a server PC (personal computer) in which software to achieve the information processing system has been installed. It should be noted that the server PC 1 is connected to a network 5.

Numeral 2 denotes a color printer which is connected to the network 5 and is the target apparatus of the calibration in the system. The printer 2 is made to be able to perform printing in response to instructions respectively sent from PC's connected on the network. Numeral 21 denotes a calibration data storage unit which is provided inside the printer 2 and used to hold or store later-described calibration data inside the printer 2. Numeral 22 denotes a printer controller which is similarly provided inside the printer 2 and controls various operations such as a printing operation and the like in the printer 2. As described later, the printer controller 22 stores the calibration data in the calibration data storage unit 21 when the calibration data is downloaded from the server PC 1, and corrects the calibration data in the calibration data storage unit 21 on the basis of later-described engine:information obtained from a printer engine 23.

Numeral 23 denotes the printer engine which is provided inside -the printer 2 and is the part basically performing the printing operation to output printing data from the printer controller 22. However, as described later, the printer engine 23 also transmits the engine information to the printer controller 22 and adjusts a maximum density in the engine characteristic.

Numeral 3 denotes a scanner which is connected to the server PC 1. In the system, the scanner 3 is used to measure a density of a patch output by the printer 2, and essentially used to read an original. Numeral 4 denotes a client PC which is connected on the network 5 and instructs to generate, edit and print desired printing data.

With respect to the above structure, a process in case of performing the calibration will be explained hereinafter with reference to flow charts shown in FIGS. 2 and 3.

Figure 2:
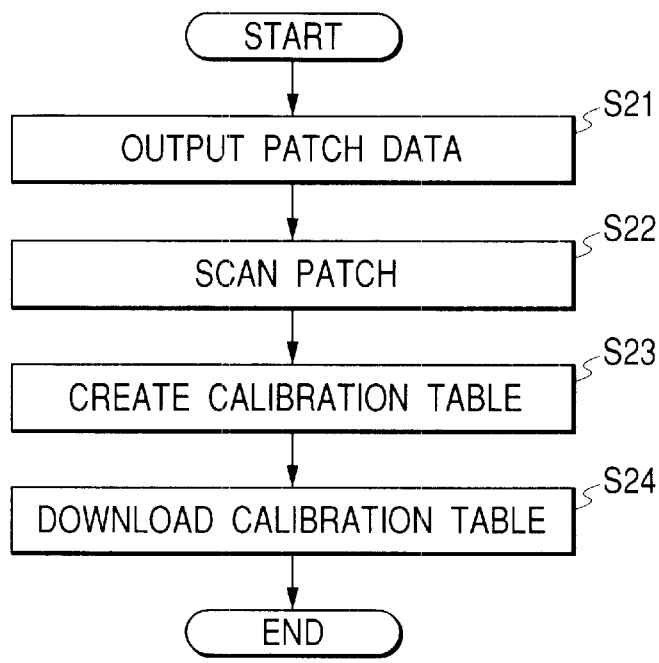
FIG. 2 is a flow chart showing a printer calibration process based on soft calibration according to the first embodiment.
Figure 3:
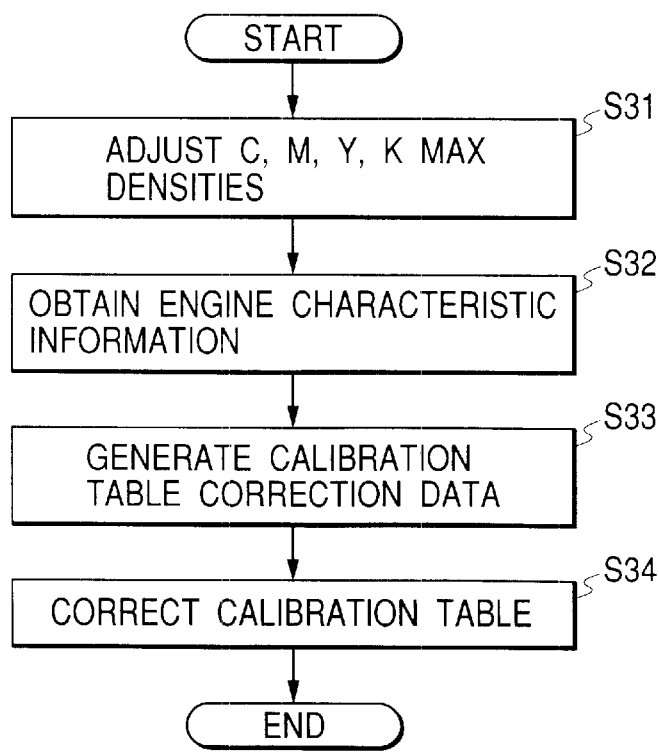
FIG. 3 is a flow chart showing a calibration data correction-process based on device calibration according to the first embodiment.

FIG. 2 is the flow chart showing the process of soft calibration performed between the server PC 1 and the color printer 2 included in the information processing system. It should be noted that the soft calibration is defined as first calibration in the two kinds of calibrations.

In this process, it is first instructed in a step S21 to output patch data for printing from the server PC 1 to the printer 2. In response to such an instruction, the printer 2 outputs and prints the patch according to the sent patch data.

Figure 6:
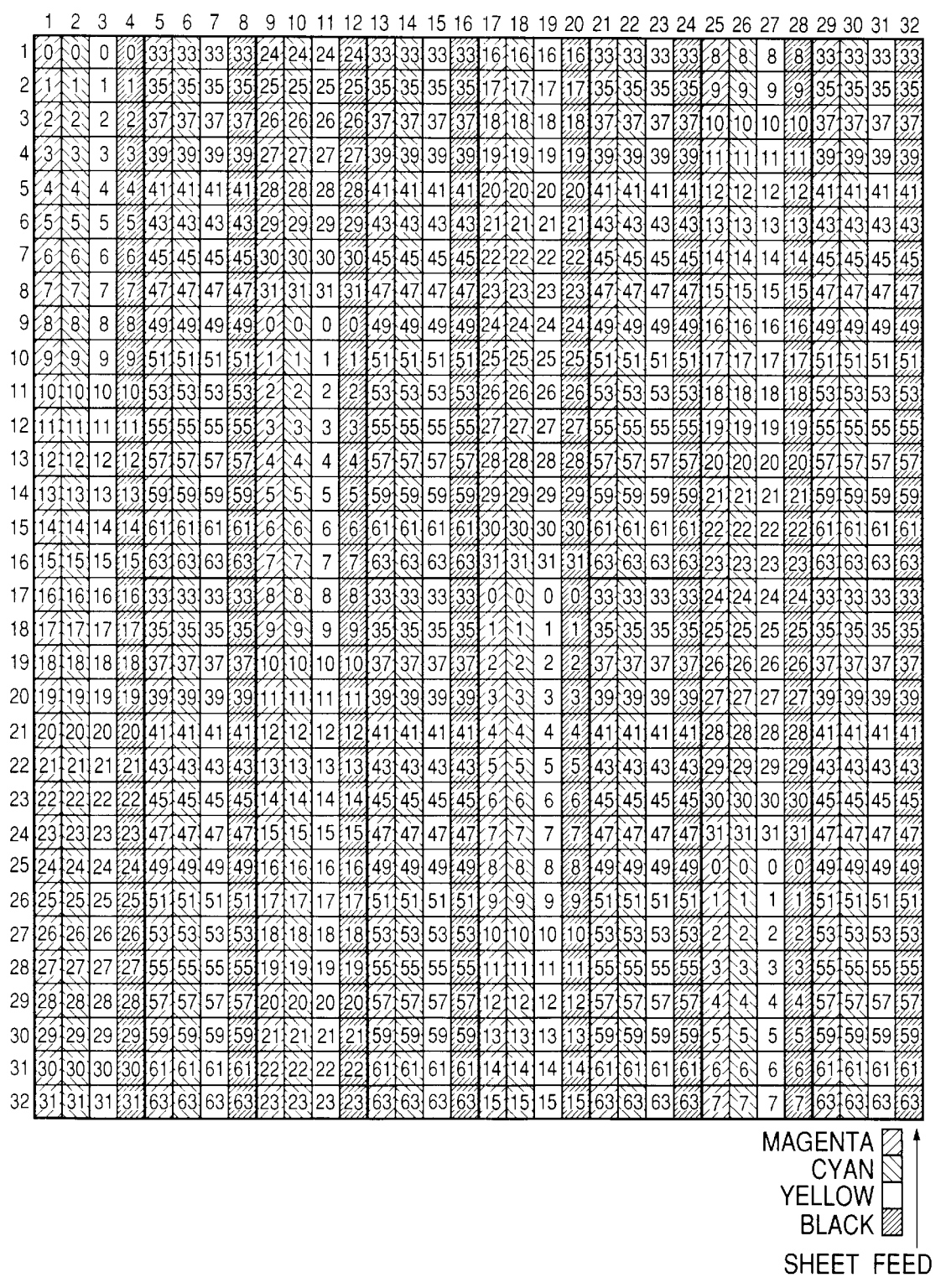

FIG. 6 is a diagram showing an example of the patch data. As shown in FIG. 6, on the basis of the patch data in the present embodiment, the patch which consists of 1024 sections (longitudinally 32×laterally 32 sections) within one page of sheet is created. One section corresponds to any of M, C, Y and K respectively corresponding to toner colors, and the number described in each section represents arrangement position information of this section in the patch. Further, as shown in FIG. 10, such the number corresponds to density data (gradation data) of each section in the patch. For example, the arrangement position "0" corresponds to the gradation value "0", the arrangement position "32" corresponds to the gradation value "128", and the arrangement position "63" corresponds to the gradation value "255". Further, as shown in FIG. 10, the gradation value in the present embodiment is given as eight-bit data for each color, i.e., any of values "0" to "255". However, if the gradation value is given by bit numbers other than eight bits, the gradation values respectively corresponding to the arrangement position information in FIG. 10 maybe changed according to such the bit numbers.

The patch shown in FIG. 6 can be divided into two blocks, i.e., a highlight block of which the density is relatively lower, and a shadow block of which the density is relatively higher. Namely, the numbers representing the arrangement position information in the highlight block are "0" to "31" (i.e., the gradation values are "0" to "124"), and the numbers representing the arrangement position information in the shadow block are "33", "35", "37", . . . "59", "61" and "63" (i.e., the gradation values are "132", "140", "148", . . . , "236", "244" and "255"). The highlight block and the shadow blocks are respectively arranged entirely in the longitudinal direction of the patch (corresponding to 32 blocks) and alternately arranged in the lateral direction of the patch. In this case, as clearly shown in FIG. 6, in the shadow block, the same block pattern is repeated by two in the longitudinal direction. On the other hand, in the highlight block, the gradation values corresponding to the respective block arrangements in the pattern repeated in the lateral direction are periodically changed.

Namely, in the patch of the present embodiment, the four blocks each corresponding to the 32-level gradation values are arranged as the highlight block, while the eight blocks each corresponding to the 16-level gradation values are arranged as the shadow block. The reason why the number of gradation values is different between the highlight block and the shadow block is that information on a more detailed density change (i.e., a printing characteristic change) is necessary on the highlight block side being the lower-density side. Further, the reason why the number of pattern arrangements in the shadow block is made larger is that the dispersion in the reading by the scanner tends to be greater in the shadow part as compared with the highlight part. According to such the patch structure, it is possible to perform highly accurate calibration with the less number of patches.

The explanation returns to FIG. 2. After the patch was printed ion the basis of the above patch data, in a step S22, a sheet on which the patch has been printed is set to the scanner 3 by a user, the patch is scanned by the scanner 3 to measure its density. Then, the scanner 3 obtains R (red), G (green) and B (blue) signal values being the measured values for each block of the patch shown in FIG. 6, and sends the obtained signal values to the server PC 1. On the basis of the sent signal values, the server PC 1 calculates the average of the four blocks of the highlight block and the average of the eight blocks of the shadow block, and resultingly obtains the 48-gradation R, G and B signal values for each of C, M, Y and K patches. Then, the server PC 1 obtains a 48-gradation density signal from a 48-gradation luminance signal by using a previously prepared luminance/density conversion table which shows the correspondence between R, G and B luminance signals from the scanner 3 and C, M, Y and K density signals of the printer 2.

Although it is not described in detail here, the scan is ordinarily performed through a scanner driver installed in the server PC 1. Further, scan resolution setting, input area designation, and the like are performed by the scanner driver.

Next, in a step S23, a calibration table is created by the server PC 1. This process will be explained with reference to FIGS. 4A to 4C.

Figure 4A:
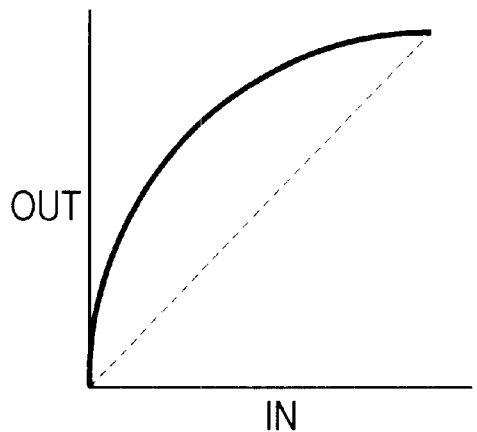
FIGS. 4A, 4B and 4C are diagrams showing a concept of calibration data generation.
Figure 4B:
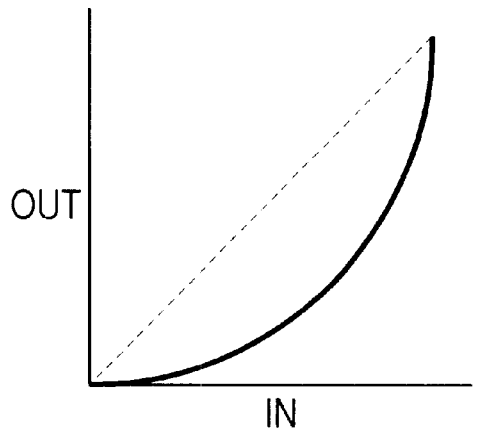
Figure 4C:
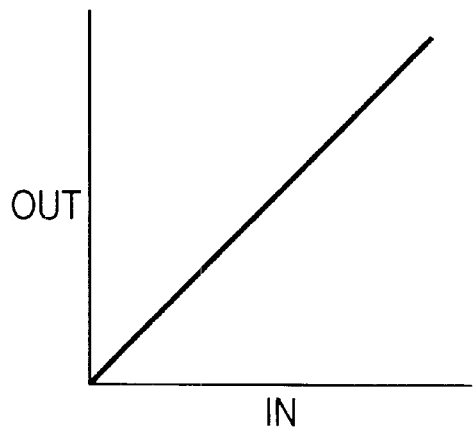

For example, the density characteristic based on the 48-gradation density values for each color is shown in FIG. 4A. Here, although the density characteristic for one color is illustrated to simplify the explanation, actually the same process is performed to the four (C, M, Y and K) colors. In FIG. 4A, on the curve representing the relation of input and output, the value existing among the 48 gradations is obtained by interpolation calculation based on the 48-gradation values. Although the actual density characteristic is shown in FIG. 4A, an ideal value of the density characteristic is represented by the linear curve as shown in FIG. 4C. Therefore, in order to approximate the actual density characteristic (FIG. 4A) to the ideal density characteristic (FIG. 4C), an inverse function shown in FIG. 4B is set as the content of the calibration table. Namely, if the calibration table (FIG. 4B) is applied to the actual density characteristic (FIG. 4A), the calibrated output result (FIG. 4C) can be obtained.

FIGS. 5A to 5D are diagrams showing the details of the calibration data correction process. Namely, the maximum density adjustment for C, M, Y and K is performed, and the engine characteristic is obtained (FIGS. 5A and 5B). Then, as shown in FIG. 5C, the calibration correction data is generated by subtracting, from the current engine characteristic, one-previous engine characteristic, and the generated calibration correction data is merged with the calibration table. The latest calibration table is thus created as shown in FIG. 5D.

Figure 7:
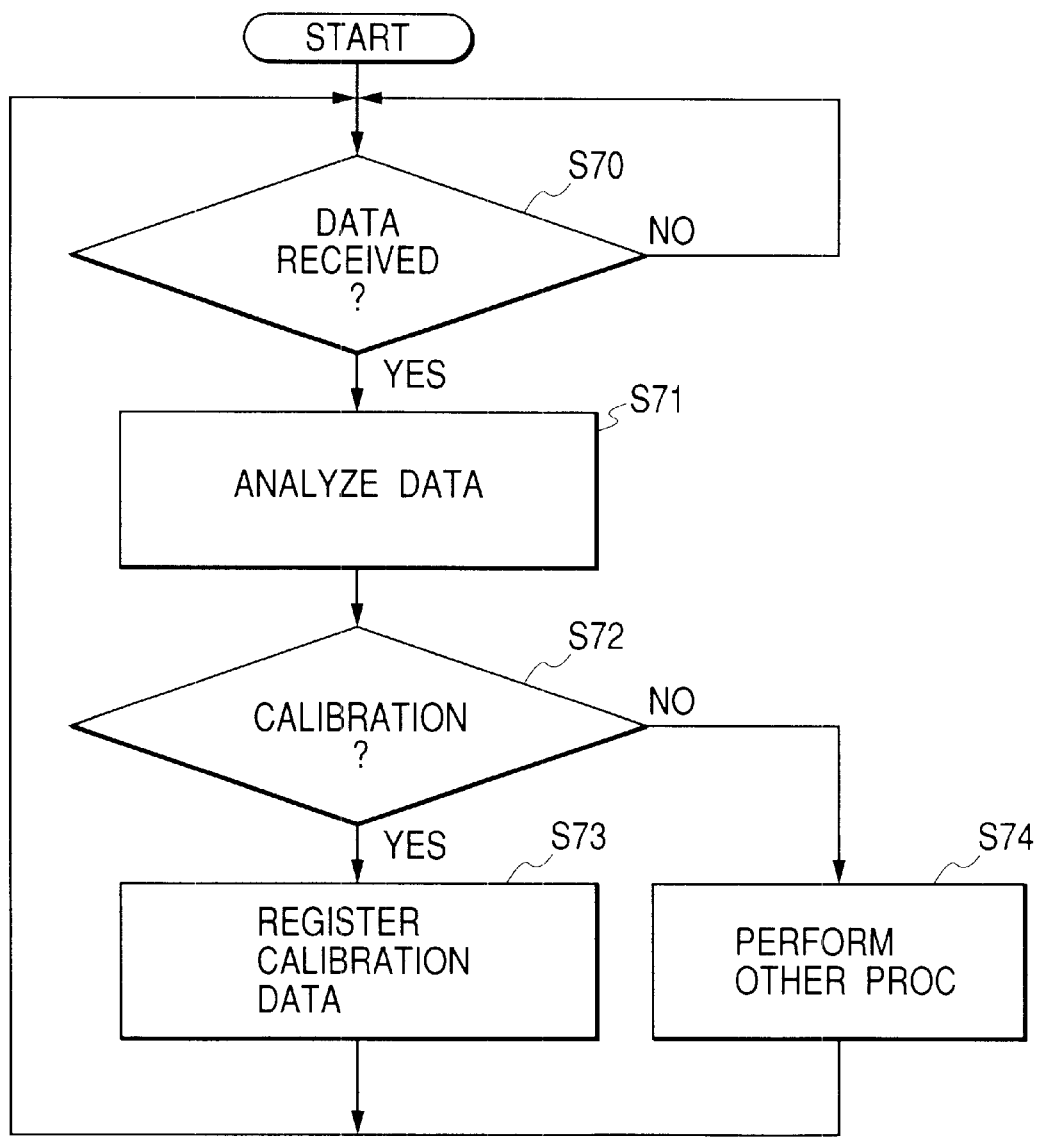
FIG. 7 is a flow chart showing a storage process of calibration data downloaded into a printer according to the first embodiment.

FIG. 7 is a flow chart showing a storage (or registration) process of the calibration data downloaded into the printer 2. In a step S70, it is judged whether or not the data is received. If judged that the data is not received, the process in the step S70 is repeated. Conversely, if judged that the data is received, the received data is analyzed in a step S71. Then, in a step S72, it is judged whether or not the received data, is a calibration download command. If judged that the received data is the calibration download command, the flow advances to a step S73 to register the engine characteristic in the calibration data storage unit. Conversely, if judged in the step S72 that the received data is not the calibration download command, the flow advances to a step S74 to perform an appropriate process according to the judged result.

Figure 8:
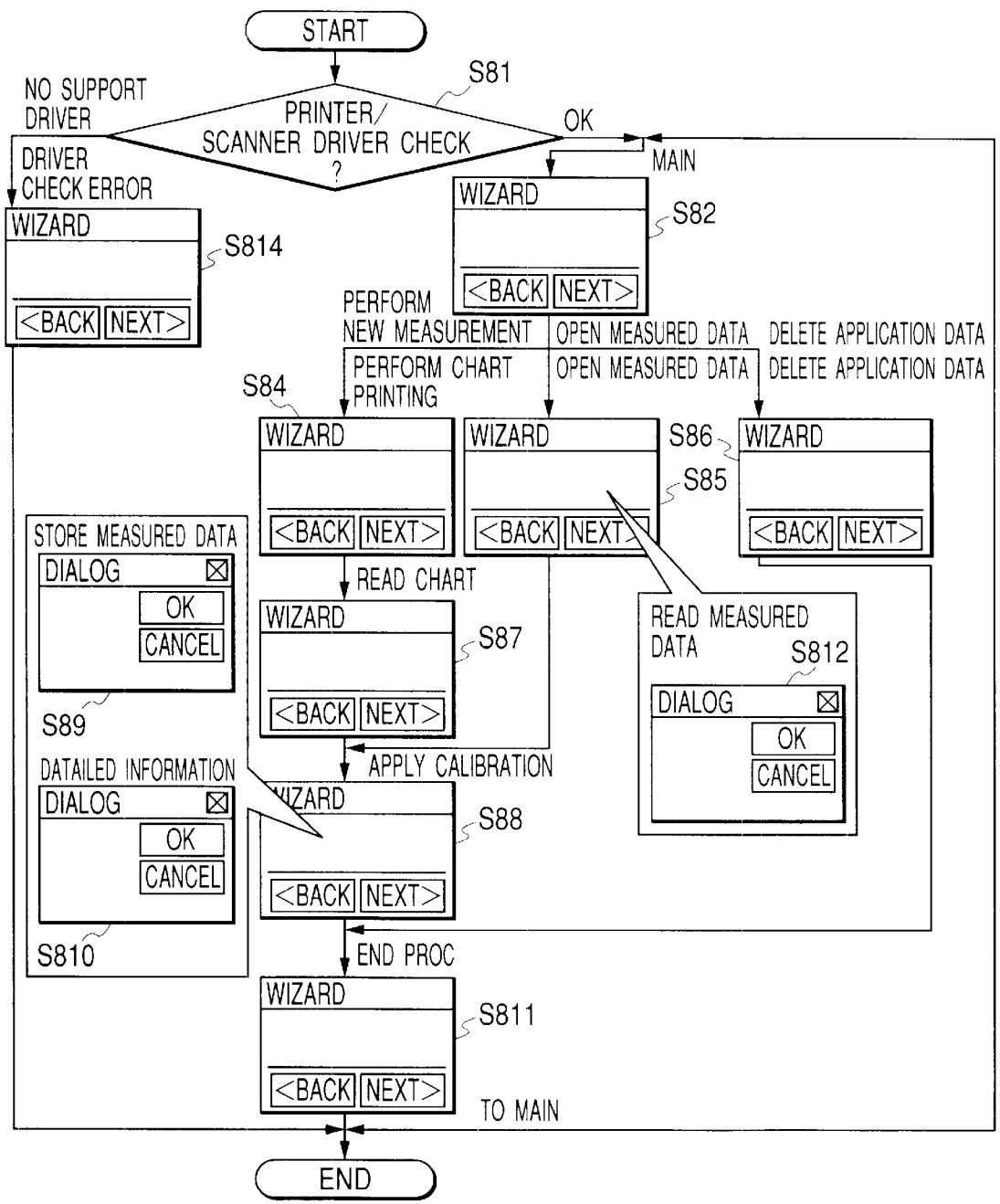
FIG. 8 is a diagram showing a series of processing screens of a UI (user interface) concerning the calibration process according to the first embodiment.
Figure 9:
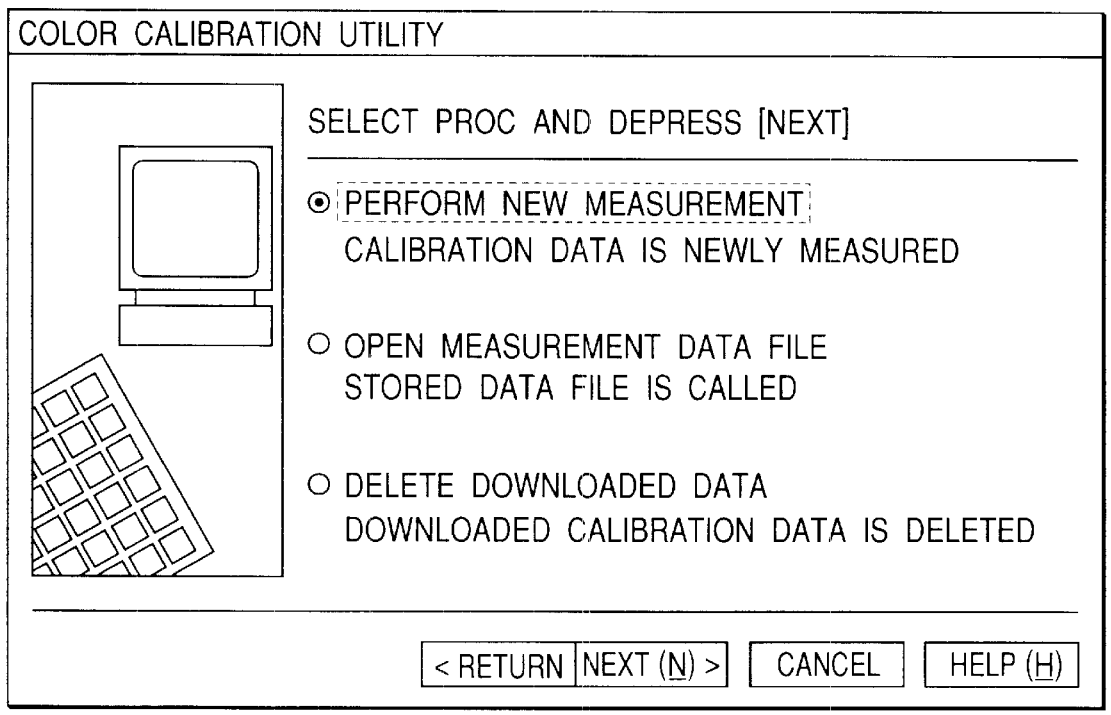
FIG. 9 is a diagram showing an example of the screen of the UI shown in FIG. 8.

FIG. 8 shows the calibration process according to the present invention. If the application is started, it is first judged in a step S81 whether or not necessary printer driver and scanner driver have been installed in the system of the server PC 1. If judged that the necessary driver is not installed, a driver check error is displayed in a step S814, and the process ends. Conversely, if judged in the step S81 that the necessary drivers have been installed, a main screen is displayed in a step S82. FIG. 9 shows an example of the main screen. As shown in FIG. 9, basically the main screen, as well as other screen, is changed to relative other screen by appropriately depressing "NEXT", "RETURN", "CANCEL" and/or "HELP" buttons. On the main screen shown in FIG. 9, three options "PERFORM NEW MEASUREMENT", "OPEN MEASUREMENT DATA FILE" and "DELETE DOWNLOADED DATA" are prepared as a selectable menu. If the option "PERFORM NEW MEASUREMENT" is selected and then the "NEXT" button is depressed, the flow advances to a step S84. In the step S84, the patch data is output to the printer 2. Next, in a step S87, the patch (chart) output and printed by the printer 2 on the basis of the patch data is measured by using the scanner 3. Next, in a step S88, the calibration is applied. Then, the processes in the steps S23 and S24 in FIG. 2 are performed, i.e., the calibration data is generated, and the generated calibration data is downloaded to the printer 2. On the display screen in the process of the step S88, since buttons to!advance to steps S89 and S810 are prepared, the process advances to the corresponding process when the appropriate button is depressed by the user. Since the display screen in the process of the step S89 is the screen enabling to store the measured data, the scan data measured in the step S87 is stored. The storage file is used in a later-described process using already-measured data. Since the display screen in the process of the step S810 is the screen displaying detailed information, the detailed information such as the measured density characteristic or the like is displayed. After the processes in the steps S89 and S810 ended, the flow returns to the step S88. Next, a process end screen is displayed in a step S811. Namely, if the end of application is designated on the process end screen, the entire process ends. On the other hand, if it is designated on the process end screen to return to the main screen, the flow returns to the step S82.

On the other hand, on the main screen of the step S82, if the option "OPEN MEASUREMENT DATA FILE" is selected and then the "NEXT" button is depressed, the flow advances to a step S85, and a screen on which measurement data is indicated is displayed. On this screen, if a "REFERENCE" button (not shown) is depressed, the screen is changed to a measurement data reading screen used in a process of a step S812. Thus, it is possible to search the measurement data in detail. Here, it should be noted that the measurement data is the data file stored in the step S89. Next, the calibration is applied in the step S88, and subsequent processes are the same as those described above.

On the other.hand, on the main screen of the step S82, if the option "DELETE DOWNLOADED DATA" is selected and then the "NEXT" button is depressed, the flow advances to a step S86 to delete the calibration data stored in the calibration data storage unit 21 of the printer 2. Although such deletion is performed in response to an instruction based on a command sent from the server PC 1 to the printer 2, this command is not referred here. Next, the screen is changed to the process end screen in the step S811, and subsequent processes are the same as those described above.

Figure 11:
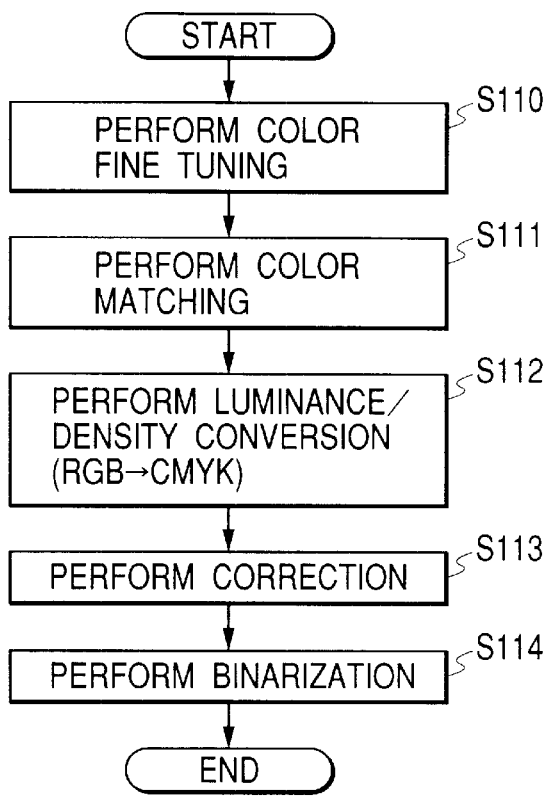
FIG. 11 is a flow chart showing an image process of the printer using the corrected calibration data according to the first embodiment.

FIG. 11 is a flow chart showing an image process of the printer using the corrected calibration data. In FIG. 11, in a step S110, color fine tuning is performed to the input R, G and B signals. Here, it should be noted that the color fine tuning includes processes such as luminance correction, contrast correction and the like. Next, in a step S111, a color matching process is performed to match a tint of a monitor and a tint of a printed result with each other. Next, in a step S112, a luminance/density conversion process is performed to convert the R, G and B input luminance signals into the Y, M, C and K density signals being the printing signals for the printer. Next, in a step S113, the calibration process is performed. Next, in a step S114, the C, M, Y and K eight-bit signals are converted into the signals according to an output system. Generally, the C, M, Y and K eight-bit signals are binarized into C, M, Y and K one-bit signals, respectively.

Figure 12:
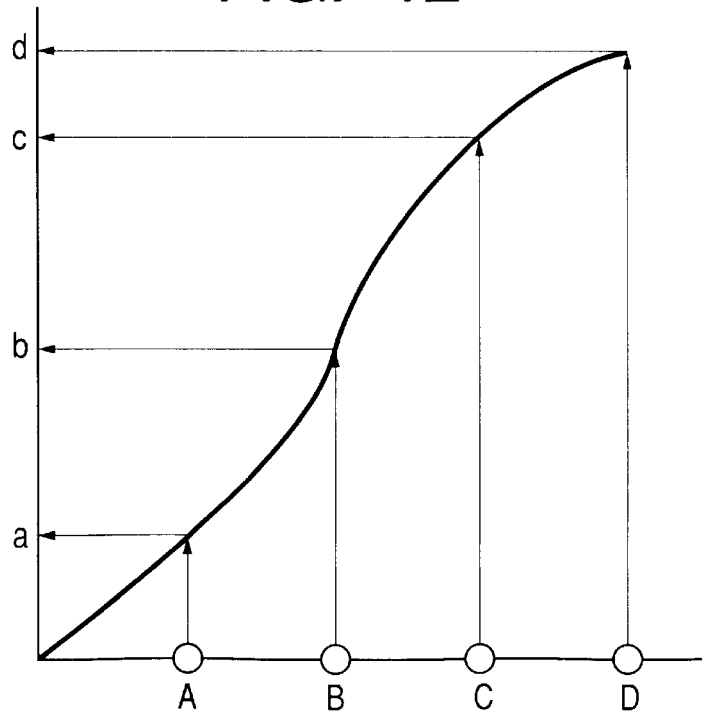
FIG. 12 is a diagram for explaining an engine characteristic of the printer according to the first embodiment.

FIG. 12 is a diagram for explaining the engine characteristic of,the printer. In FIG. 12, symbols A, B, C and D on the x-axis respectively indicate predetermined input values, and symbols a, b, c and d on the y-axis respectively indicate measurement density values corresponding to the respective input values.

Second Embodiment

Next, the second embodiment will be explained in detail.

Figure 13:
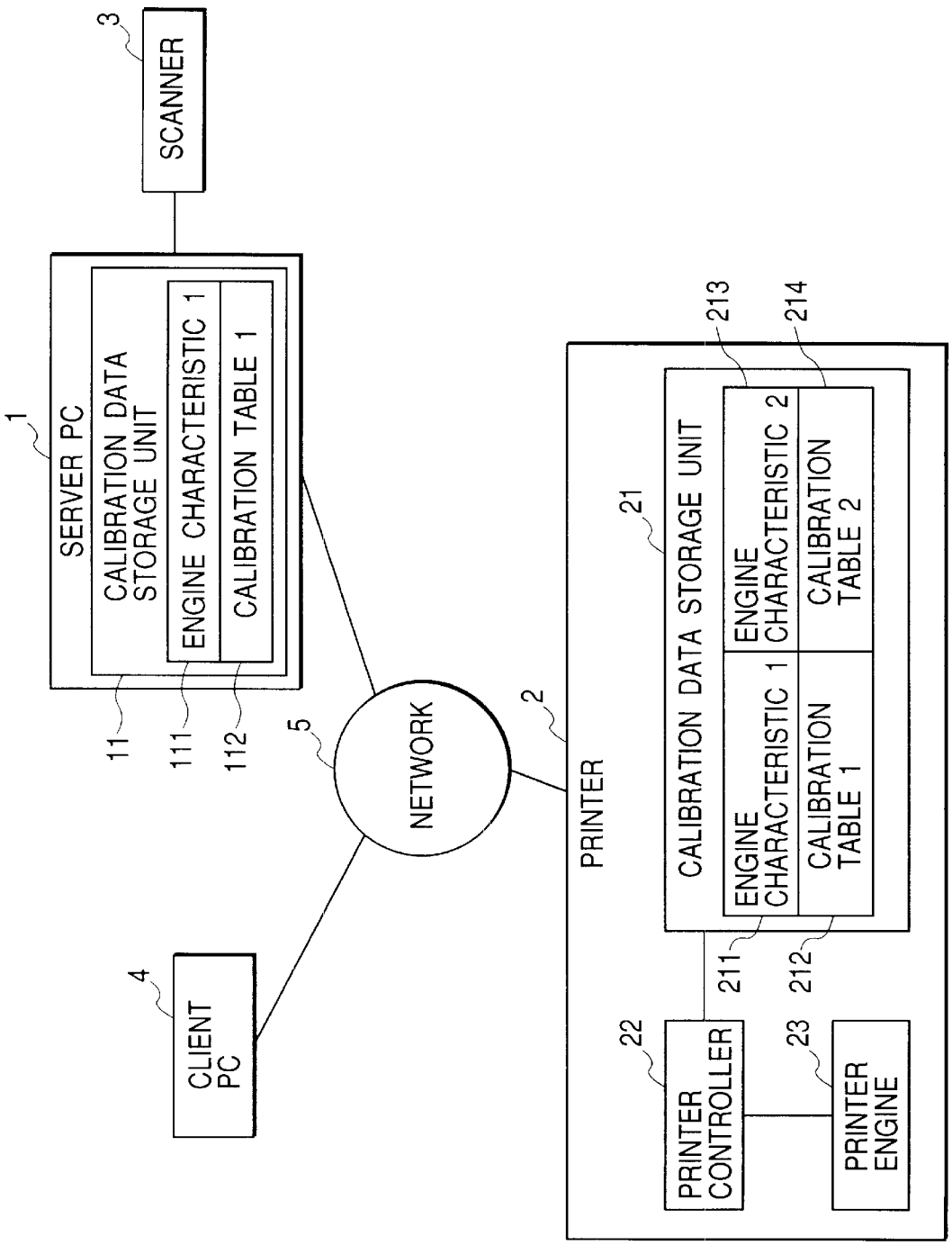
FIG. 13 is a block diagram showing an example of a structure of a printer calibration system according to the second embodiment.

FIG. 13 is a block diagram showing a printer calibration system according to the second embodiment of the present invention. It should be noted that, in the second embodiment, the same parts as in the first embodiment are added with the same numerals as those in the first embodiment.

In FIG. 13, numeral 1 denotes a server PC in which software to achieve the system in the present embodiment has been installed. It should be noted that the server PC 1 is connected to a network 5.

Numeral 11 denotes a calibration data storage unit which is disposed inside the server PC 1 and used to hold and store later-described calibration data in the server PC 1. Numerals 111 and 112 respectively denote a first engine characteristic and a first calibration table which are both stored in the calibration data storage unit 11. Here, it should be noted that the first engine characteristic and the first calibration table are equivalent respectively to an engine characteristic 1 and a calibration table 1 both shown in the drawings.

Numeral 2 denotes a color printer which is connected to the network 5 and is the target apparatus of the calibration in the system. The printer 2 is made to be able to perform printing in response to instructions respectively sent from PC's connected on the network. Numeral 21 denotes a calibration data storage unit which is provided inside the printer 2 and used to hold or store later-described calibration data inside the printer 2. Numerals 211 and 212 respectively denote the first engine characteristic and the first calibration table which were downloaded from the server PC 1 and are both stored in the calibration data storage unit 21. Numeral 213 denotes a second engine characteristic which is obtained from a later-described engine and is the latest engine characteristic, and numeral 214 denotes a second calibration table which is the latest calibration table. The second engine characteristic 213 and the second calibration table 214 are stored in the calibration data storage unit 21. Here, it should be noted that the second engine characteristic and the second calibration table are respectively equivalent to an engine characteristic 2 and a calibration table 2 both shown in the drawings.

Numeral 22 denotes a printer controller which is provided inside the printer 2 and controls various operations concerning the printer 2. The printer controller 22 stores the first engine characteristic and the first calibration table in the calibration data storage unit 21 when the first engine characteristic and the first calibration table are downloaded from the server PC 1, and updates the second calibration table in the calibration data storage unit 21.

Numeral 23 denotes a printer engine which is provided inside the printer 2 and is the part basically outputting printing data from the printer controller 22. The printer engine 23 also transmits engine characteristic information to the printer controller 22 and adjusts a maximum density in the engine characteristic.

Numeral 3 denotes a scanner which is connected to the server PC 1. In the system, the scanner 3 is used to measure a density of a patch output by the printer 2, and essentially used to read an original. Numeral 4 denotes a client PC which is connected on the network and instructs to generate, edit and print desired printing data.

With respect to the above structure, a process in case of performing the calibration will be explained hereinafter with reference to flow charts shown in FIGS. 14 and 15.

Figure 14:
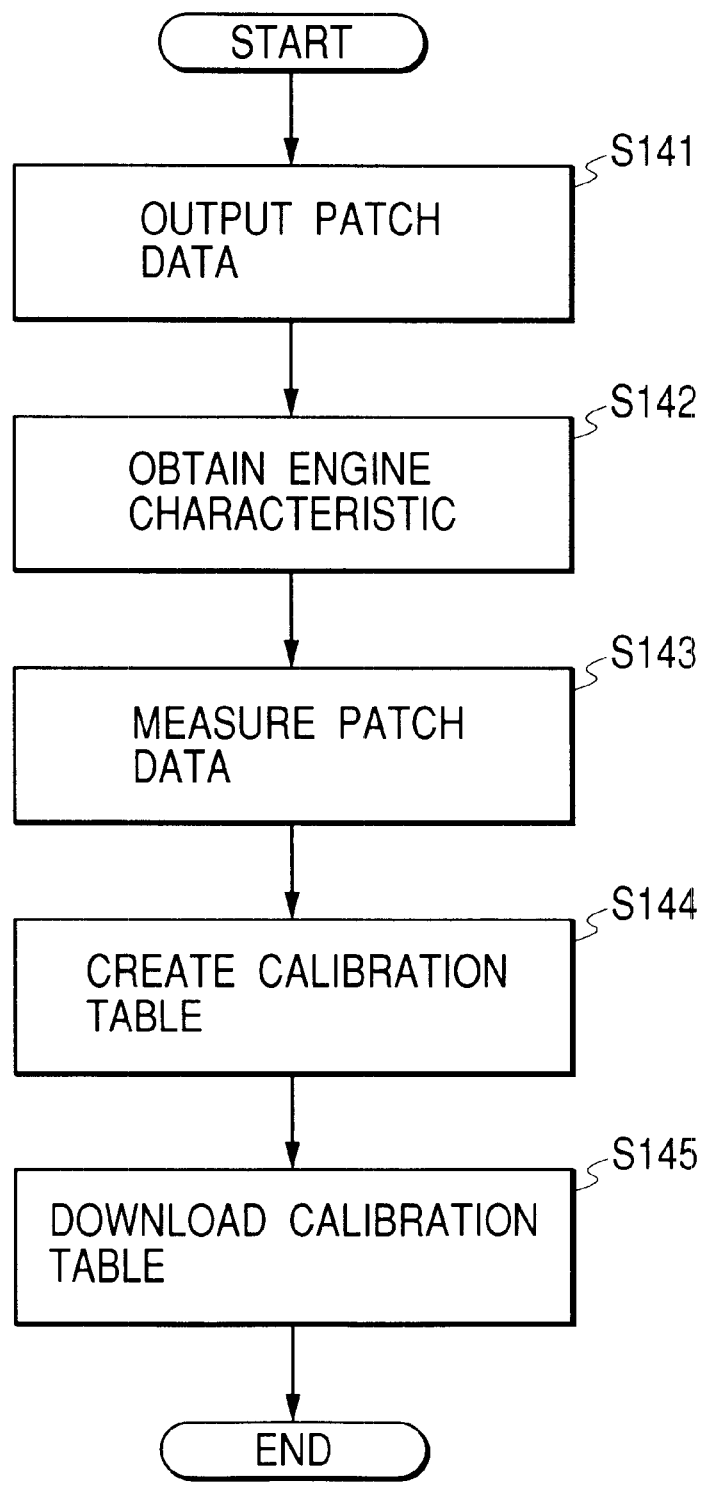
FIG. 14 is a flow chart showing a first printer calibration process.

FIG. 14 is the flow chart showing the process of soft calibration performed between the computer and the color printer included in the system.

In this process, it is first instructed in a step S141 to output patch data from the server PC 1 to the printer 2, and thus the printer 2 outputs and prints the patch according to the sent patch data. As an example of the patch data, the patch data shown in FIG. 6 can be used.

As described above, the patch is output from the printer 2 in response to the instruction from the server PC 1. However, it is possible to previously store information in the printer 2 to generate the patch data of such a format as above, and actually generate the patch data on the basis of the stored information in response to the instruction from the server PC 1. Further, it is also possible to generate the patch data by transmitting the patch data generation information from the server PC 1 to the printer 2.

In the step S141 of the FIG. 14, engine characteristic information at the patch output time is obtained immediately after the patch data was output. Namely, by obtaining from the server PC 1 the second engine characteristic being the latest engine characteristic stored in the calibration data storage unit 21 of the printer 2, the engine characteristic information is obtained.

In a step S142, the obtained second engine characteristic is stored as the first engine characteristic 111 in the calibration data storage unit 11 by the server PC 1. The first engine characteristic 111 is correlated, as the engine characteristic in case of outputting the patch data, with the later-described first calibration table. The details of the engine characteristic will be described later.

In a step S143 of FIG. 14, the output patch data is measured by the scanner 3. The scanner 3 inputs R, G and B signal values of each block of the patch data, and returns the values to the server PC 1. From the sent signal values, the server PC 1 calculates the average of the four blocks of the highlight block and the average of the eight blocks of the shadow block on the basis of the block arrangement of the patch data, and resultingly obtains 48-gradation R, G and B signal values for each of C, M, Y and K. Then, the server PC 1 obtains a 48-gradation density signal from a 48-gradation luminance signal by using a previously prepared luminance/density conversion table (not shown) which shows the correspondence between R, G and B luminance signals from the scanner 3 and C. M, Y and K density signals of the printer 2.

Although it is not described in detail here, the scan is ordinarily performed through a scanner driver installed in the server PC 1. Further, scan resolution setting, input area designation, and the like are performed by the scanner driver.

Next, in a step S144, a calibration table is created by the server PC 1. Since this process has been already explained with reference to FIGS. 4A to 4C, redundant explanation is omitted.

In the step S144, the calibration table created by the server PC 1 is stored as the first calibration table 112 in the calibration data storage unit 11.

Next, in.a step S145, the first engine characteristic 111 and the first calibration table 112 in the calibration data storage unit 11 are downloaded to the printer 2 by the server PC 1. The first engine characteristic 111 and the first calibration table 112 both downloaded are stored as the first engine characteristic 211 and the first calibration table 212 in the calibration data storage unit 21 through the printer controller 22.

Figure 17:
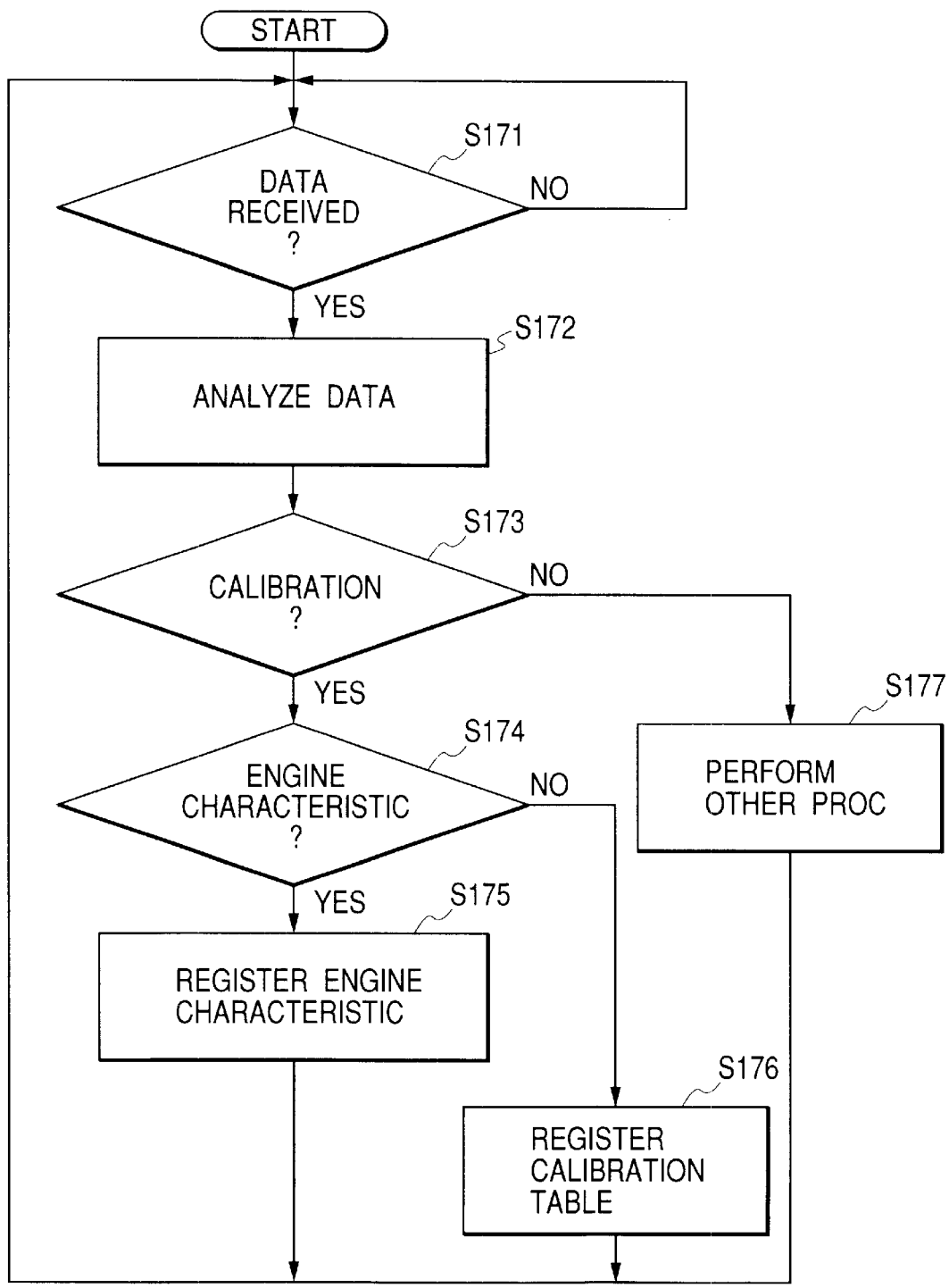
FIG. 17 is a flow chart showing a process in a case where a calibration data download command is received in the printer.

A process by the printer controller 22 in a case where the downloaded data is received by the printer 2 will be explained with reference to a flow chart shown in FIG. 17.

In a step S171, it is judged whether or not the data is received. If judged that the data is not received, the process in the step S171 is repeated. Conversely, if judged that the data is received, the received data is analyzed in a step S172. Then, in a step S173, it is judged whether or not the received data is a calibration download command. If judged that the received data is the calibration download command, it is further judged in a step S174 whether or not the data to be downloaded is engine characteristic data. If judged that the data is the engine characteristic data, the flow advances to a step S175 to register the engine characteristic as the first engine characteristic 211 in the calibration data storage unit 21. Conversely, if judged in the step S174 that the data to be downloaded is not the engine characteristic data, it is judged that the received data represents the calibration table, and the flow advances to a step S176 to register the calibration table as the first calibration table 212 in the calibration data storage unit 21. Further, if judged in the step S173 that the received data is not the calibration download command, the flow advances to a step S177 to perform an appropriate process according to the judged result.

Ordinarily, the printing data is given from the application on the server PC 1 to the printer 2 through the printer driver on the server PC 1. Thus, in the process of FIG. 17, the printer controller 22 of the printer 2 performs printing data analyzing, page layout making, image editing, printing and the like.

Figure 20:
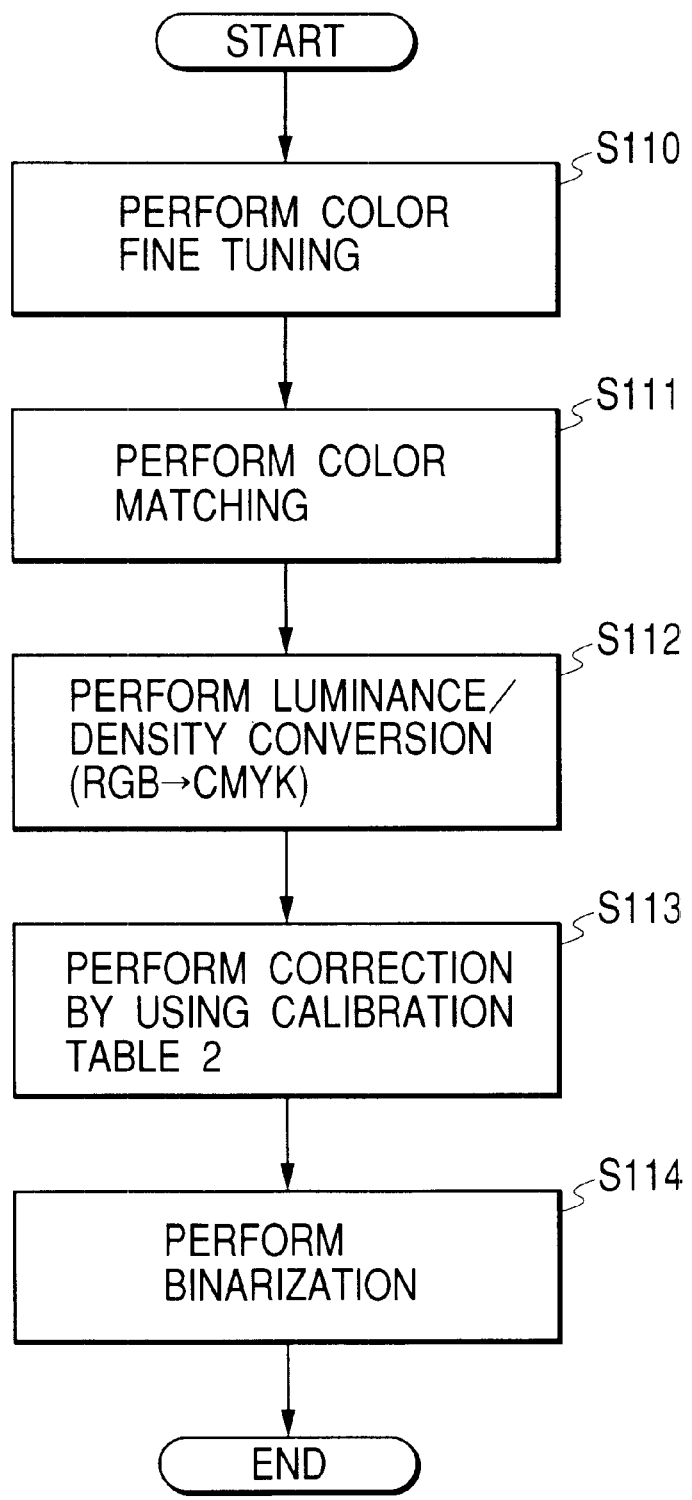
FIG. 20 is a flow chart showing an image process in the printer.

Next, the image process which is performed by the printer controller 22 with use of the calibration data will be explained with reference to FIG. 20. This process is substantially the same as that of the first embodiment, and will be thus explained with the same step numbers as those shown in FIG. 11.

First, in a step S110, color fine tuning is performed to the input R, G and B signals. Here, it should be noted that the color fine tuning includes processes such as luminance correction, contrast correction and the like. Next, in a step S111, a color matching process is performed to match a tint of a monitor and a tint of a printed result with each other. Next, in a step S112, a luminance/density conversion process is performed to convert the R, G and B input luminance signals into the Y, M, C and K density signals being the printing signals for the printer. Next, in a step S113, the calibration process is performed. Namely, by using the C, M, Y and K eight-bit multivalue signals as input/output signals and using the calibration table 2 being the latest calibration table, the output characteristic is made linear. Next, in a step S114, the C, M, Y and K eight-bit signals are Converted into the signals according to an output system. Generally, the C, M, Y and K eight-bit signals are binarized into C, M, Y and K one-bit signals, respectively.

As explained in the first embodiment, a color printing characteristic can be relatively stabilized by the soft calibration shown in FIG. 14. However, an engine characteristic has a tendency to easily change relatively if a drum temperature increases due to, e.g., continuous printing or the like. Thus, a user must frequently perform the soft calibration to always obtain a steady printed result.

Thus, even in the present embodiment, in order to reduce a user's load and increase calibration accuracy, the device calibration is combined with the soft calibration as follows.

Figure 15:
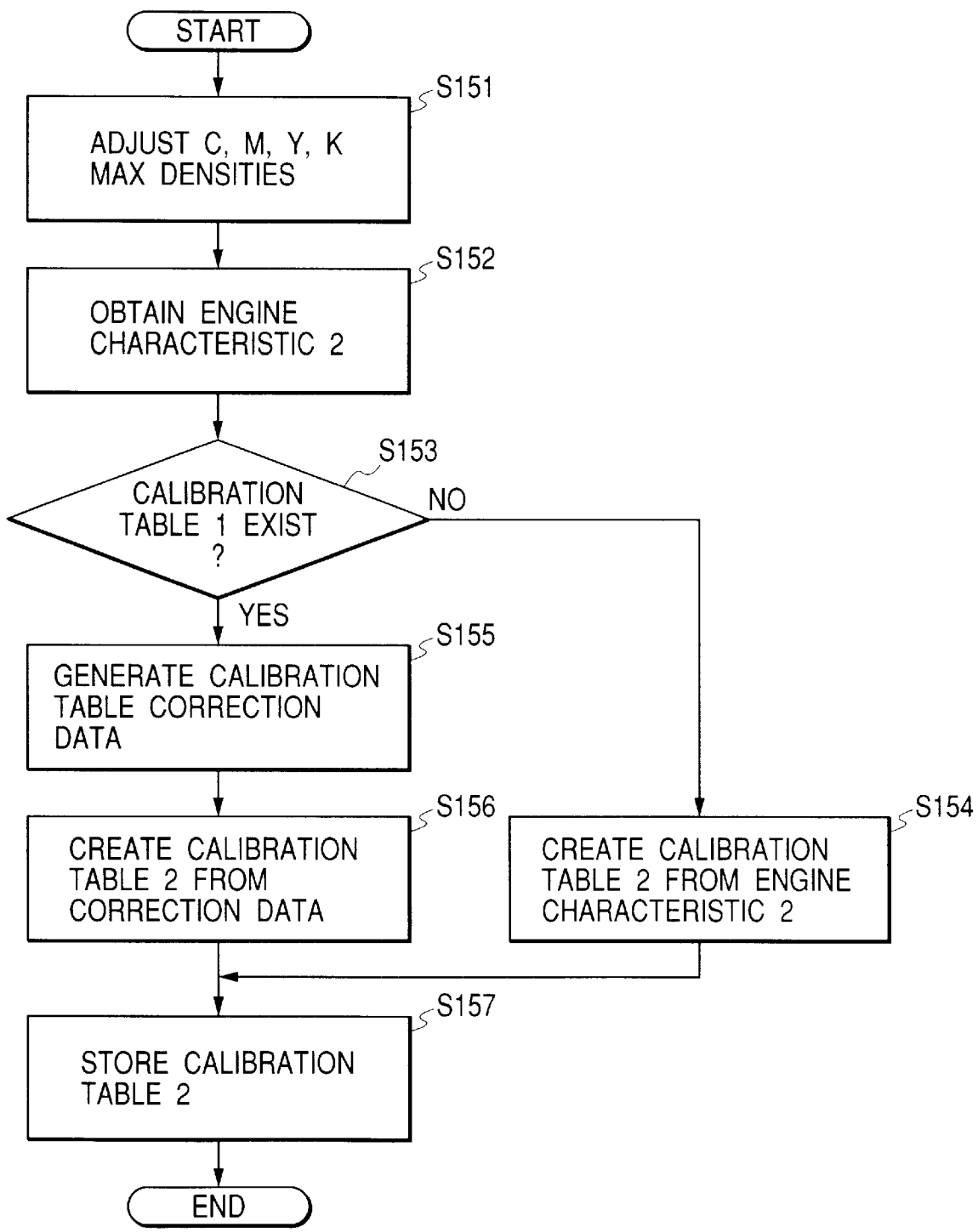
FIG. 15 is a flow chart showing a second printer calibration process.

FIG. 15 is the flow chart for explaining the device calibration which is performed between the printer controller 22 and the printer engine 23 both constituting the color printer 2 in the present embodiment, and a process to combine the soft calibration and the device calibration with each other.

The device calibration is performed between the printer engine 23 and the printer controller 22 on the basis of an event, as a trigger, with high possibility by which the engine characteristic changes. For example, this event includes a change in output of a not-shown temperature/humidity sensor, the number of printing, an exchange of a drum and a toner cartridge, and the like. It should be noted that, although other various matters can be considered to be included in this event, these matters are not referred here.

In FIG. 15, in a step S151, an image formation condition is optimized by the printer engine 23. In the present embodiment, a maximum density of each of C, M, Y and K is adjusted. Ordinarily, in the printer engine, although a target maximum density at designing time has been determined, the set maximum density swings up and down due to a successive change. In this step, the maximum density value of each of C, M, Y and K is obtained by a not-shown development system such as a density sensor on a drum. If the maximum density swings up and down, the appropriate maximum density adjustment is performed by controlling the image formation condition such as a development bias value and the like.

Then, a change of a density characteristic curve when the device calibration is performed will be explained with reference to FIG. 19.

Figure 19:
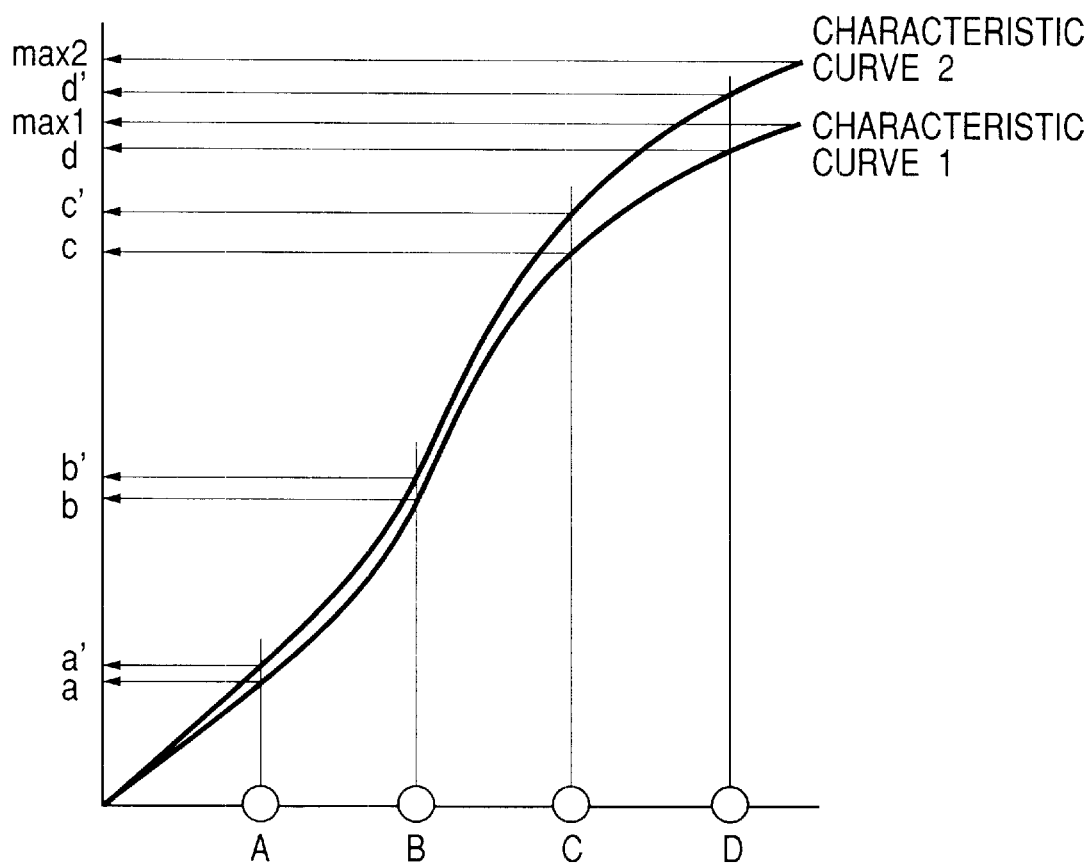
FIG. 19 is a diagram showing a concept of calibration data generation in second calibration.

In FIG. 19, a characteristic curve 2 is an example of the density characteristic curve before the maximum density adjustment, while a characteristic curve 1 is an example of the density characteristic curve after the maximum density adjustment. Here, symbol max2 indicates the maximum density value of the characteristic curve 2. If the maximum density adjustment is started, it is detected by the density sensor disposed oppositely to the drum that the current maximum density, value is the max2. Symbol max1 indicates the target value of the maximum density value in the printer. Thus, the printer engine controls the development bias value and the like such that the maximum density value becomes the max1.

Next, in a step S152, the second engine characteristic being the latest engine characteristic is obtained. Concretely, in this step, a patch for density measurement is generated on the drum in response to a request from the printer controller 22, and sensor output values of plural intermediate densities are returned from the printer engine 23 to the printer controller 22. Such a state will be explained with reference to FIG. 19. In FIG. 19, although the intermediate density values of, e.g., four points are picked up and explained to simplify the explanation, the number of points to be picked up is not limited to this. Symbols A, B, C and D on the x-axis respectively indicate predetermined input values, and symbols a, b, c and d on the y-axis respectively indicate measurement density values corresponding to the respective input values. The printer engine 23 communicates with the printer controller 22 to give the four points a, b, c and d to the printer controller 22.

Incidentally, symbols a', b', c' and d' indicate intermediate density sensor values before the maximum density adjustment. Namely, the intermediate density sensor values a', b', c' and d' are respectively changed to the measurement density values a, b, c and d through the maximum density adjustment. Namely, since the intermediate density sensor value, i.e., the engine characteristic, is greatly influenced by the maximum density adjustment, it is necessary to always perform the process in the order of the maximum density adjustment and the engine characteristic obtaining as a series of flow.

Generally, in the sensors of the above development system, since the characteristics of the sensors themselves are dispersed, there is no accuracy by which the absolute density value can be obtained. However, when the characteristic of the development system itself changes, the identical sensor produces a sensor output value according to such a change. Namely, relative accuracy can be expected although absolute accuracy is low.

Next, in a step S153, it is judged whether or not the first calibration table has been downloaded into the calibration data storage unit 21.

If judged that the first calibration table is not yet downloaded into the calibration data storage unit 21, the flow advances to a step S154 to create the second calibration table in the same manner as that in the conventional device calibration. Such a process will be explained with reference to the characteristic curve 1 shown in FIG. 19. In the conventional device calibration, the characteristic curve 1 is first obtained by an approximation expression from the intermediate density sensor values a, b, c and d being the engine characteristic, and the second calibration table is created by generating the inverse function for obtaining the target characteristic with use of the relation shown in FIGS. 4A to 4C.

Conversely, if judged in the step S153 that the first calibration table has been downloaded into the calibration data storage unit 21, the flow advances to a step S155. In the step S155, calibration table correction data is generated by the printer controller 22 in the following manner. Namely, such a characteristic curve as shown by the characteristic curve 1 of FIG. 19 is first obtained by an approximation expression from the second engine characteristic 213 being the latest engine characteristic in the calibration data storage unit 21. Next, a characteristic curve is similarly obtained by an approximation expression from the first engine characteristic 211 being the engine characteristic at the soft calibration time. Then, as temporary calibration tables (data) for the respective characteristic curves, the tables are obtained from the inverse function curve such that the linear curve as shown in FIG. 4C can be obtained. The calibration table correction data is generated by obtaining the difference between these two temporary calibration tables. Such information is the information which represents a characteristic change of a sensor level measuring a patch density on the drum.

As described above, according to the present invention, the result of the soft calibration can be corrected on the basis of the result of the device calibration.

Further, since the calibration table correction data is generated on the basis of the engine characteristic obtained by the sensor used in the device calibration, it is possible to generate highly accurate data without any influence of the difference of the sensor characteristic.

Next, in a step S156, the second calibration table stored in the calibration data storage unit 21 is updated by the printer controller 22. This process is performed by merging the calibration table correction data generated in the step S155 with the first calibration table stored in the calibration data storage unit 21.

In a step S157, the created second calibration table is stored in the calibration data storage unit 21.

Such a series of operations will be explained with reference to FIGS. 16A to 16D. FIG. 16A shows the first calibration table which is created by the server PC 1 through the soft calibration and stored in the calibration data storage unit 21. As shown in FIG. 16B, the maximum density adjustment for C, M, Y and K is performed by the printer engine 23, and the second engine characteristic is exchanged between the printer controller 22 and the printer engine 23. Then, as shown in FIG. 16C, the calibration table correction data is generated by the printer controller 23 on the basis of the second engine characteristic and the first engine characteristic at soft calibration time, and the generated calibration table correction data is merged with the first calibration table. The latest second calibration table thus created is stored as the second calibration table 214 in the calibration data storage unit 21. Then, the printer controller 22 always performs the density correction process shown in the step S113 of FIG. 20 by using the second calibration table stored in the calibration data storage unit 21.

Figure 18:
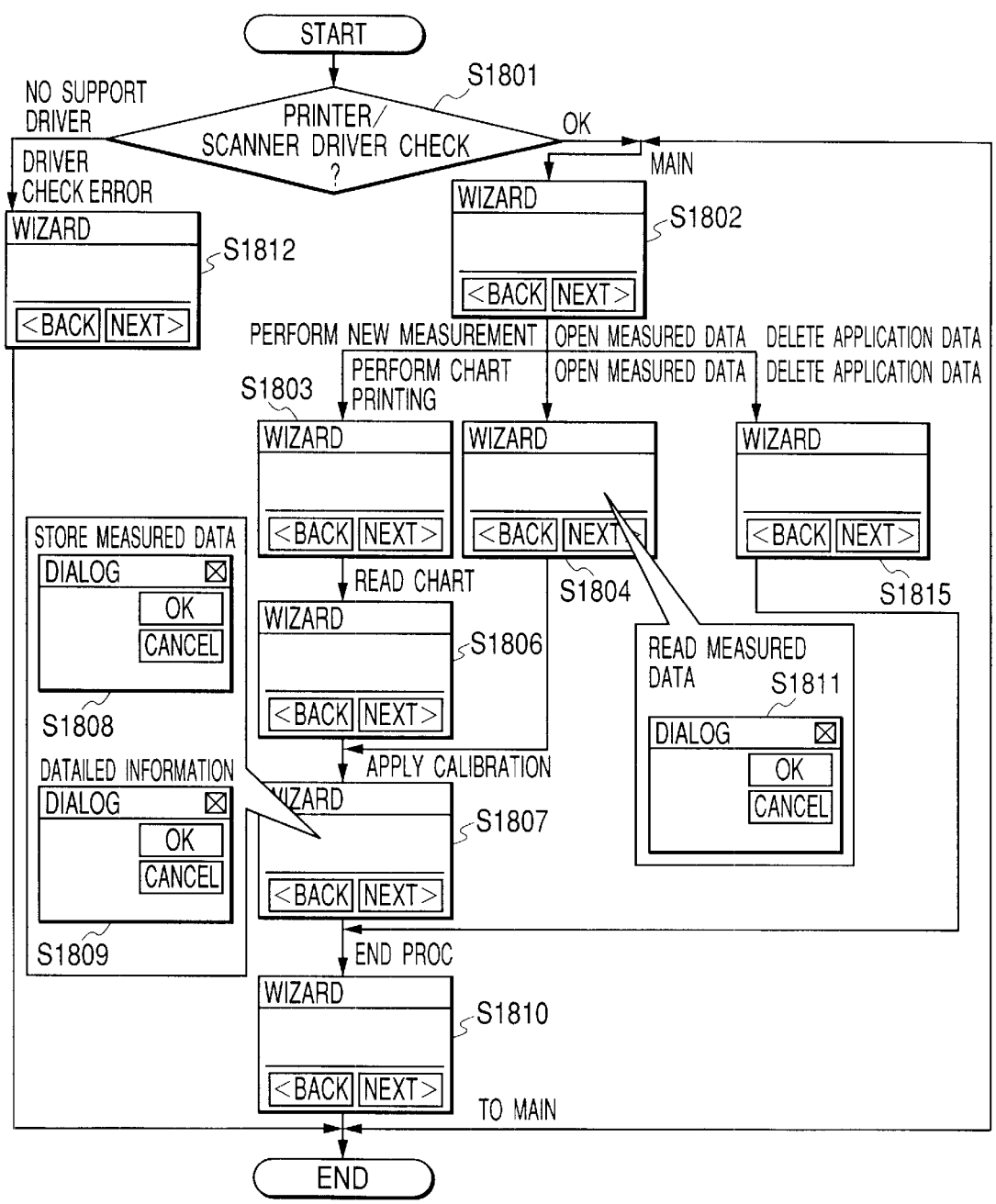
FIG. 18 is a flow chart showing a series of processes based on a UI according to an application.

Next, a flow of UI (user interface) in the server PC 1 of the printer calibration system according to the present invention will be explained with reference to FIG. 18. It should be noted that this system is made on the server PC 1 as a kind of application.

If the application is started, it is first judged in a step S1801 whether or not necessary printer driver and scanner driver have been installed in the system of the server PC 1. If judged that the necessary driver is not installed, a driver check error is displayed in a step S1812, and the process ends. Conversely, if judged in the step S1801 that the necessary drivers have been installed, a main screen is displayed in a step S1802. As previously described, FIG. 9 shows an example of the main screen. On the main screen shown in FIG. 9, if the option "PERFORM NEW MEASUREMENT" is selected and then the "NEXT" button is depressed, the flow advances to a step S1803. In the step S1803, the patch data is output to the printer 2. Next, in a step S1806, as described above, the patch data is measured by the scanner 3. Next, in a step S1807, the calibration is applied. In this step, the processes in the steps S144 and S145 in FIG. 14 are performed, i.e., the calibration data is generated, and the generated calibration data is downloaded to the printer 2. On the display screen in the step S1807, since buttons to advance to steps S1808 and S1809 are prepared, the process advances to the corresponding process when the appropriate button is depressed by the user. Since the display screen in the step S1808 is the screen enabling to store the measured data, the scan data measured in the step S1806 is stored. The storage file can be used in a later-described process using already-measured data. Since the display screen in the step S1809 is the screen displaying detailed information, the detailed information such as the measured density characteristic or the like is displayed. After the processes in the steps S1808 and S1809 ended, the flow returns to the step S1807. Next, a process end screen is displayed in a step S1810. Namely, if the end of application is designated on the process end screen, the entire process ends, while if it is designated on the process end screen to return to the main screen, the flow returns to the step S1802.

On the other hand, on the main screen of the step S1802, if the option "OPEN MEASUREMENT DATA FILE" is selected and then the "NEXT" button is depressed, the flow advances to a step S1804, and a screen on which measurement data is indicated is displayed. On this screen, if a not-shown "REFERENCE" button is depressed, the screen is changed to a measurement data reading screen used in a process of a step S1811. Thus, it is possible to search the measurement data in detail. Here, it should be noted that the measurement data is the data file stored in the step S1808. Next, the calibration is applied in the step S1807, and subsequent processes are the same as those described above.

On the other hand, on the main screen of the step S1802, if the option "DELETE DOWNLOADED DATA" is selected and then the "NEXT" button is depressed, the flow advances to a step S1805 to delete the calibration data stored in the calibration data storage unit 21 of the printer 2. Although such deletion is performed in response to an.instruction based on a command sent from the server PC 1 to the printer 2, this command is not referred here.

Next, the screen is changed to the process end screen in the step S1810, and subsequent processes are the same as those described above.

As above, the flow of the printer calibration system UI operating as the application on the server PC 1 was described.

Incidentally, if judged in the step S153 of FIG. 15 that the first calibration table does not exist inside the printer 2, the printer 2 inquires the server PC 1 about whether the first calibration table has been held or stored in the server PC 1. If the first calibration table has been held or stored in the server PC 1, the first engine characteristic and the first calibration table may be downloaded to the printer 2.

According to the present embodiment, in response to the instruction through the computer constituting the system, the user performs the soft calibration at frequency not higher so far, generates the calibration data, and downloads the generated calibration data to the color printer. For this reason, after that, basically the engine characteristic change is automatically subjected to fine tuning on the printer side, whereby the user's load can be reduced. Further, a synergistic effect of the merits of both the conventional soft calibration and the conventional device calibration can be obtained. Thus, it is possible to always perform steady color printing.

Third Embodiment

Figure 21:
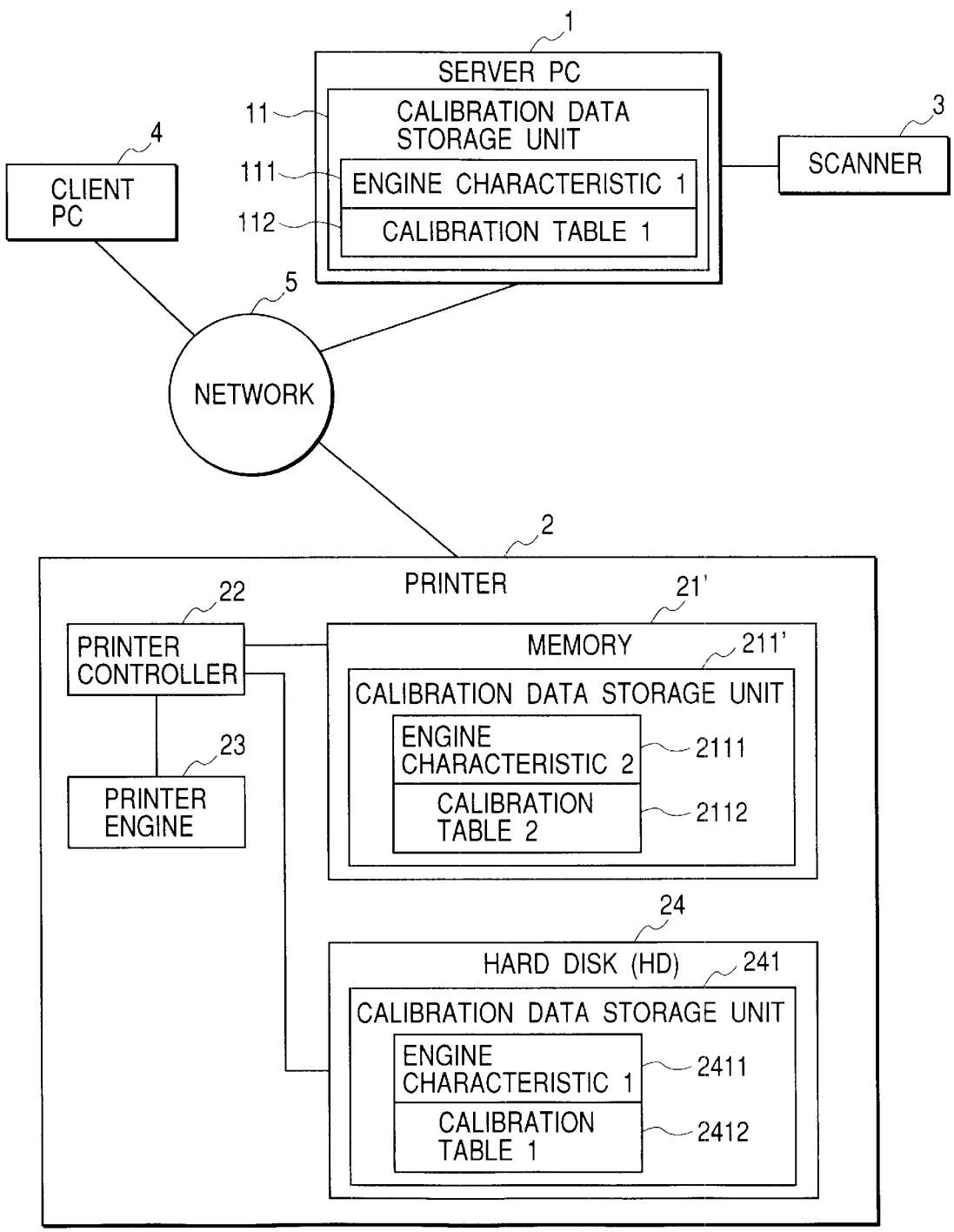
FIG. 21 is a block diagram showing an example of a structure of a printer calibration system according to the third embodiment.

FIG. 21 is a block diagram showing a printing system according to the third embodiment of the present invention. It should be noted that the third embodiment is a modification of the second embodiment, and the feature of the present embodiment is to provide a hard disk (this might be called "HD" hereinafter) inside the printer 2 as shown in FIG. 21.

Hereafter, the structure different from the second embodiment will be explained. It should be noted that, in the third embodiment, the same parts as in the second embodiment are added with the same numerals as those in the second embodiment, and the explanations thereof will be omitted.

In FIG. 21, numeral 2 denotes a color printer which is connected to a network 5, and numeral 24 denotes a storage device such as a hard disk or the like which is provided inside the printer 2. Numeral 241 denotes a calibration data storage unit which is provided inside the hard disk 24 and used to hold or store calibration data inside the printer 2. Numerals 2411 and 2412 respectively denote a first engine characteristic and a first calibration table which were downloaded from the server PC 1 and are both stored in the calibration data storage unit 241. Numeral 21' denotes a temporary memory such as a RAM (random-access memory) which is provided inside the printer 2, and numeral 211' denotes a calibration data storage unit which is provided inside the memory 21'. Numeral 2111 denotes a second engine characteristic which is the latest engine characteristic obtained from an engine and is stored in the calibration data storage unit 211', and numeral 2112 denotes a second calibration table which is the later-described latest calibration table and is stored in the calibration data storage unit 211'.

The feature of the present embodiment is to store in the temporary memory (RAM) the second engine characteristic and the second calibration table created and generated in the device calibration, and store in the hard disk the first engine characteristic and the first calibration table created and generated in the soft calibration and then downloaded from the server PC 1.

According to the present embodiment, the first engine characteristic and the first calibration table can be held even if a power supply is cut. Further, by holding or storing the calibration data in the hard disk or the like, such the calibration data can be restored without performing again the sort calibration when the power supply of the color printer is again turned on.

Fourth Embodiment

Figure 22:
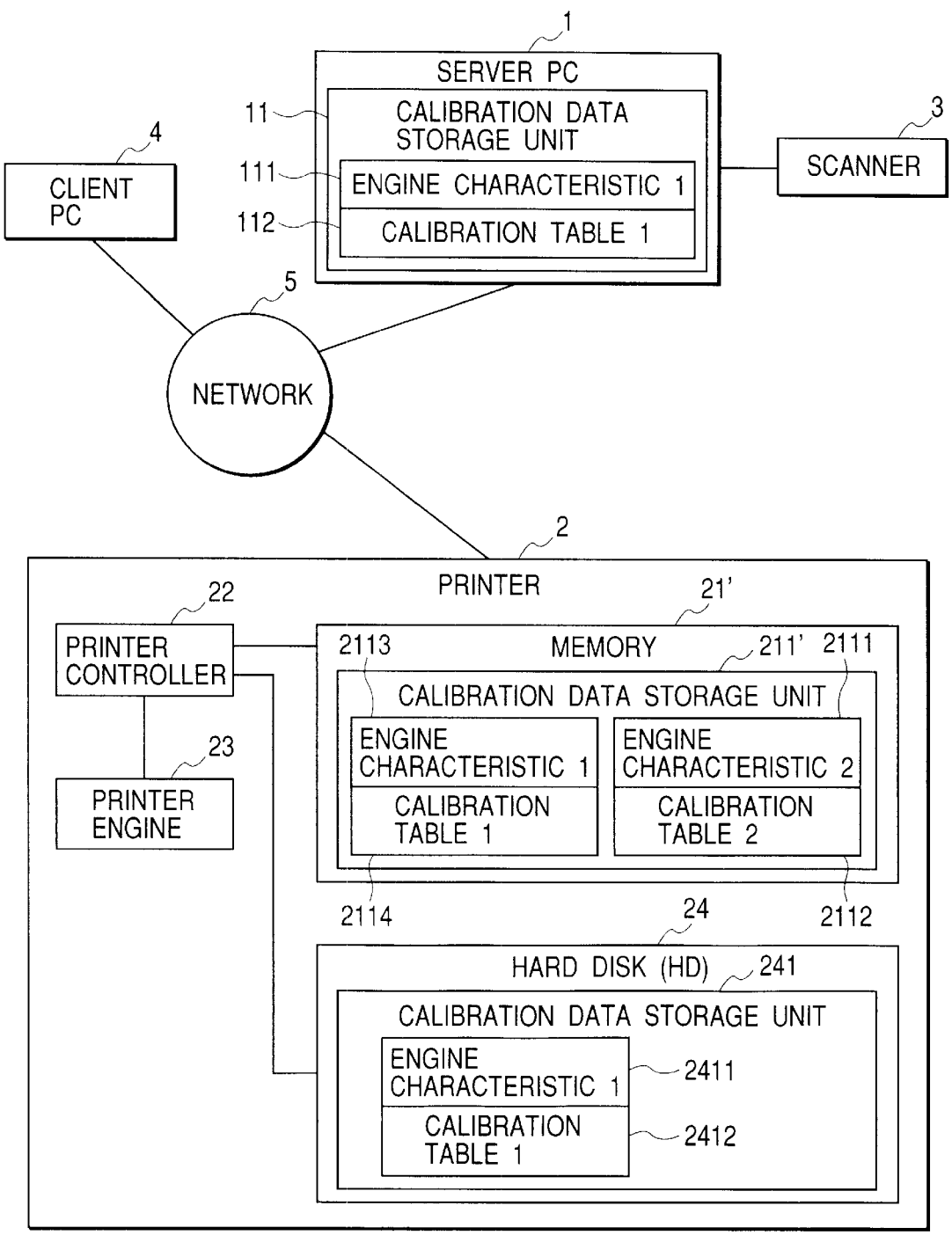
FIG. 22 is a block diagram showing an example of a structure of a printer calibration system according to the fourth embodiment.

FIG. 22 is a block diagram showing a printing system according to the fourth embodiment. In the third embodiment, the first calibration table and the first engine characteristic information are stored in the hard disk of the printer, and the second calibration table is created on the basis of the stored information. On the other hand, in the present embodiment, a first calibration table and first engine characteristic information are stored in a memory of a printer, and simultaneously reproduced (duplicated) and stored in a hard disk. Therefore, although the process concerning calibration in the present embodiment is basically the same as that in the third embodiment, the present embodiment is different from the third embodiment in the point that a flow of each data corresponds to the reproduction to the hard disk and a control method corresponds to such the flow.

It should be noted that, in the fourth embodiment, the same parts as,in the above first to third embodiments are added with the same numerals as those in the above embodiments, and the explanations thereof will be omitted.

Further, it should be noted that the present embodiment is not limited to the hard disk. Namely, the present invention is of course applicable to any nonvolatile memory capable of being used as a backup memory.

In FIG. 22, numeral 21' denotes a temporary memory such as a RAM or the like which is provided inside a ILL-i printer 2, and numeral 211' denotes a calibration data storage unit which is provided on the memory. Numerals 2113 and 2114 respectively denote a first engine characteristic and a first calibration table which are stored in the calibration data storage unit 211'. Numeral 24 denotes a storage device such as a hard disk or the like which is provided inside the printer 2. Numeral 241 denotes a calibration data storage unit which is provided on the hard disk. Numerals 2411 and 2412 respectively denote a first engine characteristic and a first calibration table which are reproduced from the first engine characteristic 2113 and the first calibration table 2114 and stored in the calibration data storage unit 241. As described later, if the calibration data does not exist on the memory, a printer controller 22 acts to reproduce the calibration data from the hard disk and store it in the memory.

In such a structure as described above, a flow of the calibration will be explained with reference to FIG. 23.

First, in a step S2301, as well as the second embodiment, a maximum density of each of C, M, Y and K is adjusted by the printer engine 23. Next, in a step S2302, as well as the second embodiment, a second engine characteristic being the latest engine characteristic is obtained. Then, in a step S2303, it is judged whether or not the first calibration table 2114 exists in the calibration data storage unit 211' of the memory 21'. If judged that the first calibration table 2114 does not exist in the calibration data,storage unit 211', then it is judged in a step S2304 whether or not the hard disk 24 exists in the printer 2. If judged that the hard disk 24 does not exist, the flow advances to a step S2308 to create a second calibration table 2111 in the same manner as that in the conventional device calibration. Conversely, if judged in the step S2304 that the hard disk 24 exists in the printer 2, then it is judged in a step S2305 whether or not the first calibration table 2412 exists in the calibration data storage unit 241. If judged that the first calibration table does not exist, the flow advances to the step S2308 to create a second calibration table 2112 in the same manner as that in the conventional device calibration. Conversely, if judged in the step S2305 that the first calibration table exists, the flow advances to a step S2306 to reproduce the first engine characteristic 2411 stored in the calibration data storage unit 241 of the hard disk 24 and store the reproduced first engine characteristic 2411 to the first engine characteristic 2113 in the calibration data storage unit 211' of the memory 21'. Next, in a step S2307, the first calibration table 2412 stored in the calibration data storage unit 241 of the hard disk 24 is reproduced and stored to the first calibration table 2114 in the calibration data storage unit 211' of the memory 21'. On the other hand, if judged in the step S2303 that the first calibration table 2114 exists in the calibration data storage unit 211', the flow advances to a step S2309. In the step S2309, calibration table correction data is generated by the printer controller 22. Next, in a step S2310, the second calibration table is updated by the printer controller 22. Then, in a step S2311, the created second calibration table is stored in the calibration data storage unit 211'.

Figure 24:
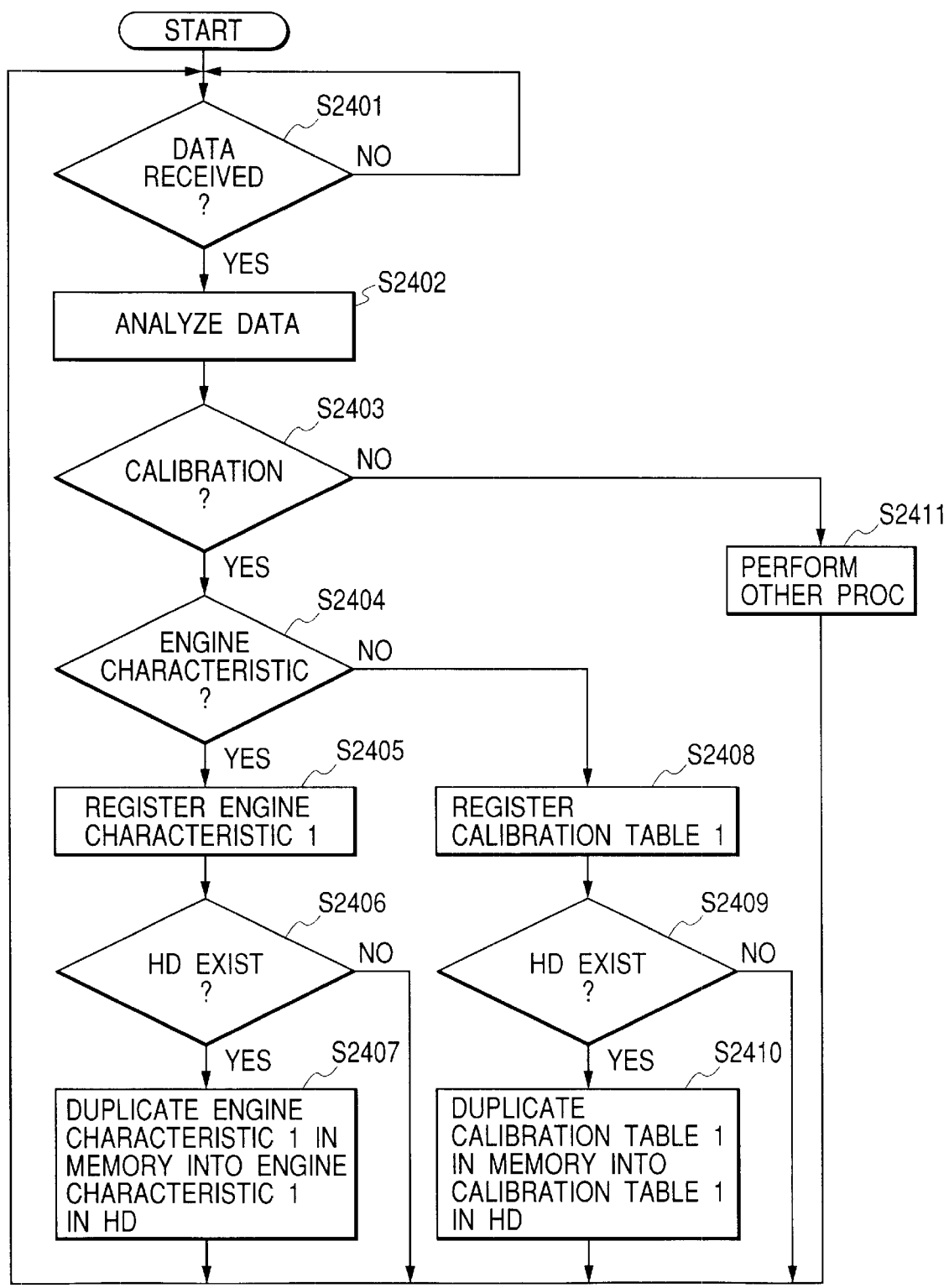
FIG. 24 is a diagram showing a concept of calibration data generation according to the fourth embodiment.

Next, a process by the printer controller 22 in a case where the downloaded data is received by the printer 2 will be explained with reference to a flow chart shown in FIG. 24. In this case, it should be noted that, since processes in steps S2401 to S2405, S2408 and S2411 are the same as those in the steps S171 to S177 in FIG. 17, the explanation thereof will be omitted.

In a step S2406, it is judged whether or not the hard disk 24 exists in the printer 2. If judged that the hard disk 24: exists in the printer 2, the flow advances to a step S2407 to reproduce the first engine characteristic 2113 in the calibration data storage unit 211' of the memory 21' and store the reproduced first engine characteristic 2113 to the first engine characteristic 2411 in the calibration data storage unit 241 of the hard disk 24.

If judged in the step S2404 that the received data is not the engine characteristic data, and if judged in a step S2409 that the hard disk 24 exists in the printer 2, the flow advances to a step S2410 to reproduce the first calibration table 2114 in the calibration data storage unit 211' and store the reproduced first calibration table 2114 to the first calibration table 2412 stored in the calibration data storage unit 241.

Figure 25:
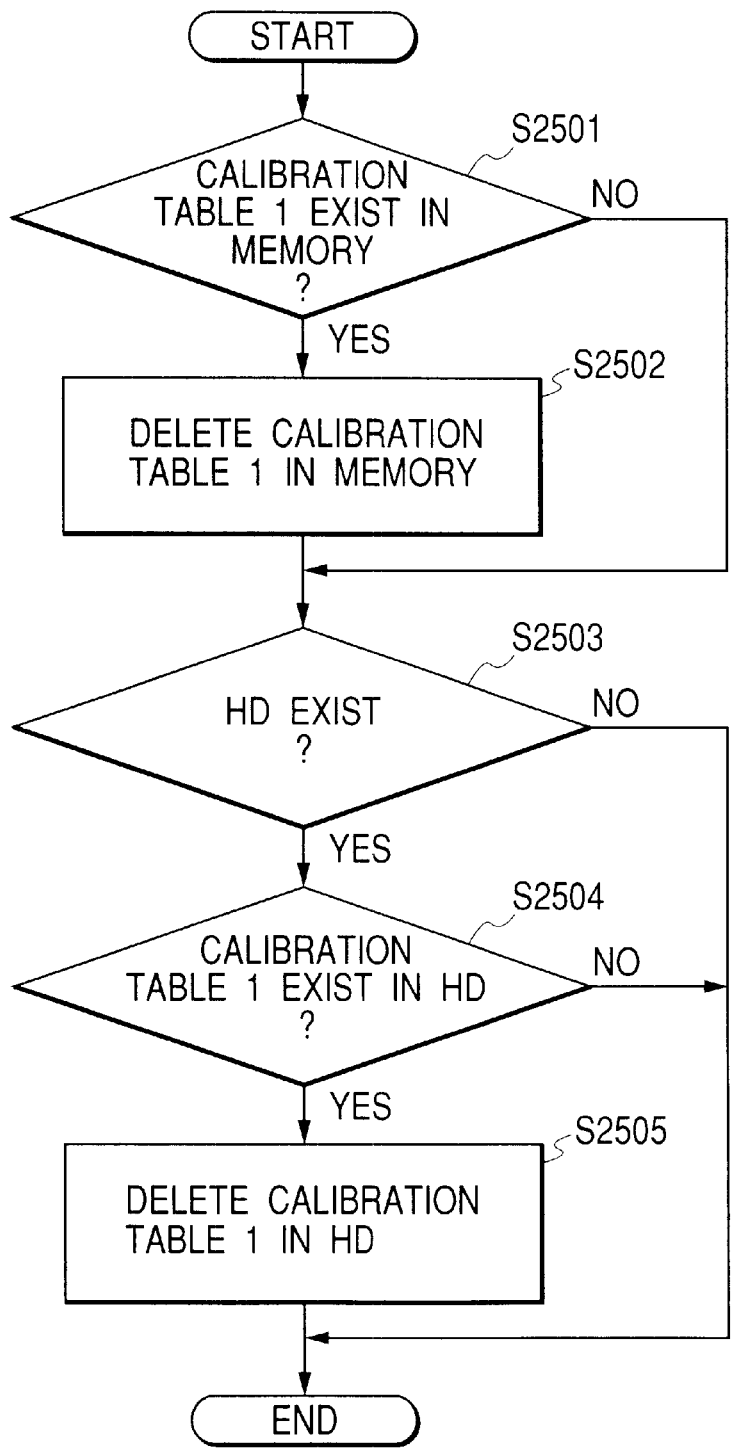
FIG. 25 is a flow chart showing a calibration data deletion process according to the fourth embodiment.

FIG. 25 shows a process in a case where deletion of the downloaded data is instructed in the present embodiment. In FIG. 25, it is judged in a step S2501 whether or not the calibration table exists in the calibration data storage unit 211' of the memory 21'. If judged that the calibration table exists in the calibration data;storage unit 211', the flow advances to a step S2502 to delete the existing calibration table. Next, it is judged in a step S2503 whether or not the hard disk exists. If judged that the hard disk exists, then it is judged in a step S2504 whether or not the calibration table exists in the hard disk. If judged that the calibration table exists in the hard disk, the flow advances to a step S2505 to delete the calibration table existing in the hard disk.

According to the present embodiment, since the calibration table can be created by using the calibration data on the memory, it is possible to create the calibration table at higher speed as compared with the above third embodiment. Further, it is possible to separately and properly use the hard disk for a backup and the memory for high-speed access.

Fifth Embodiment

Figure 26:
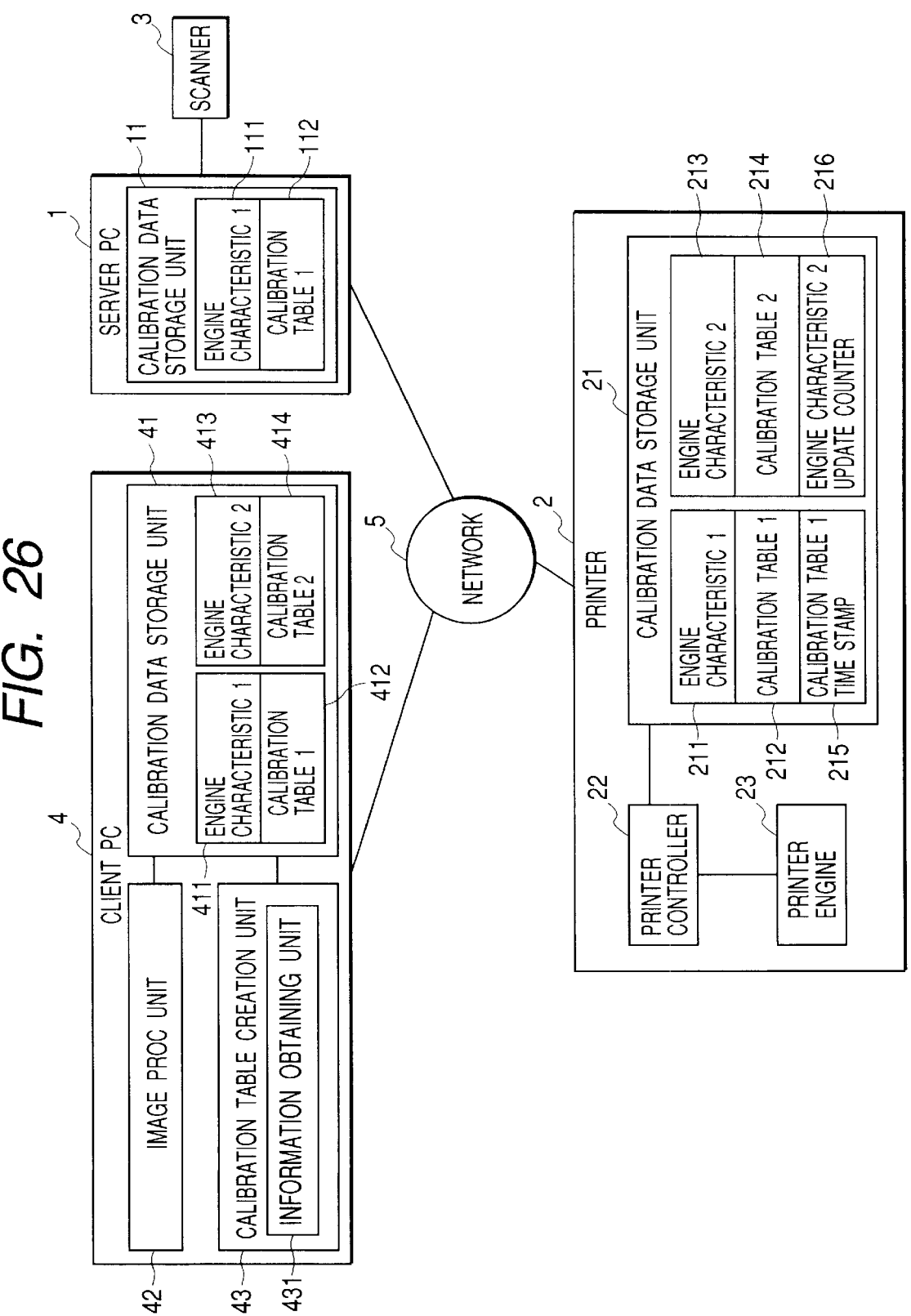
FIG. 26 is a block diagram showing an example of a structure of a printer calibration system according to the fifth embodiment.

FIG. 26 is a block diagram showing a structure of a printer calibration system according to the fifth embodiment. It should be noted that, in the fifth embodiment, the same parts as in the above first to fourth embodiments are added with the same numerals as those in the above embodiments. Numeral 1 denotes a server PC which is connected to a network 55 and in which software for achieving the system in the present embodiment has been installed.

A calibration data storage unit 11 provided inside the server PC 1 is used to hold and store later-described calibration data inside the server PC 1.

A first engine characteristic 111 and a first calibration table 112 have been stored in the calibration data storage unit 11.

A printer 2 which is connected to the network 5 is the apparatus to which calibration in the system is performed. The printer 2 is made to be able to perform printing in response to instructions from plural PC's connected on the network.

A calibration data storage unit 21 provided inside the printer 2 is used to hold and store later-described calibration data inside the printer 2.

The calibration data storage unit 21 stores a first engine characteristic 211 and a first calibration table 212 which are both downloaded from the server PC 1, and time stamp information 215 which represents a time when the first calibration table 212 was downloaded.

Further, the calibration data storage unit 21 stores a second engine characteristic 213 being the latest engine characteristic obtained from a later-described engine, a second calibration table 214 being the latest calibration table, and a second engine characteristic update counter 216 counted and updated every time the second engine characteristic 213 being the latest engine characteristic is obtained.

A printer controller 22 which is provided inside the printer 2 performs various control for the printer 2. Also, when a later-described first engine characteristic, a first calibration table and the time stamp information are downloaded from the server PC 1, the printer controller 22 acts to store the downloaded data in the calibration data storage unit 21. Further, as described later, the printer controller 22 acts to update the second calibration table in the calibration data storage unit 21 and transmit the data in the calibration data storage unit 21 to a later-described client PC.

Basically, a printer engine 23 which is provided inside the printer 2 outputs printing data from the printer controller 22. Further, the printer 23 acts to transmit later-described engine characteristic information to the printer controller 22 and adjust a maximum density in the engine characteristic.

A scanner 3 which is connected to the server PC 1 is used to measure patch data output in the printer 2 of the system. However, as essential use, the scanner 3 can be used to input an original.

A client PC 4 which is connected on the network instructs to, e.g., generate desired printing data, edit the generated data, and print the edited data. The process by the client PC 4 includes a process in a PDL mode and a process in an image mode. In the PDL mode, rasterizing and binarizing are performed in the printer controller 22 of the printer 2, and R, G and B multivalue data are sent from the client PC 4 to the printer 2. On the other hand, in the image mode, image processes including the rasterizing and the binarizing are performed on the client PC 4, and C, M, Y and K binary data are sent to the printer 2. In this case, although the explanation is performed with use of binary data by way of example, the data depends on an engine output form, whereby four-value data, 16-value data and the like can be also applied.

It is possible to thought a case where these two modes are switched and used by a user through a not-shown UI of the printer driver, and a case where these two modes are automatically switched and used based on a utility program on the client PC 4. Anyway, the detailed processes in these two modes will be described later.

A calibration data storage unit 41 provided inside the client PC 4 is used to hold and store later-described calibration data inside the client PC 4. Numerals 411 and 412 respectively denote a first engine characteristic and a first calibration table which are uploaded from the printer 2 and stored in the calibration data storage unit 41. Numeral 413 denotes a second engine characteristic which is the latest engine characteristic uploaded from the printer 2 and stored in the calibration data storage unit 41. Numeral 414 denotes a second calibration table which is the latest calibration table created by a calibration table creation unit 43 in the client PC 4.

An image processing unit 42 provided inside the client PC 4 performs a later-described image process. A calibration table creation unit 43 provided inside the client PC 4 creates a calibration table on the basis of the information stored in the calibration data storage unit 41. An information obtaining unit 431 provided in the calibration table creation unit 43 uploads the first engine characteristic, the first calibration table and the second engine characteristic from the printer 2, and stores the uploaded data in the calibration data storage unit 41, as described above.

Figure 27:
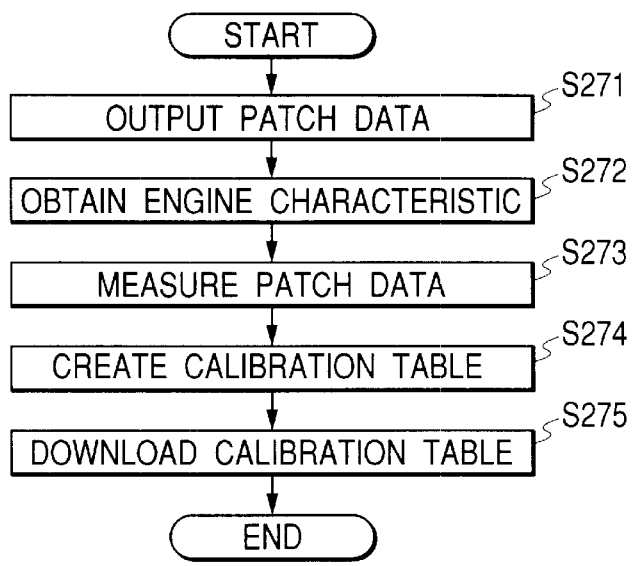
FIG. 27 is a flow chart showing a first printer calibration process according to the fifth embodiment.
Figure 28:
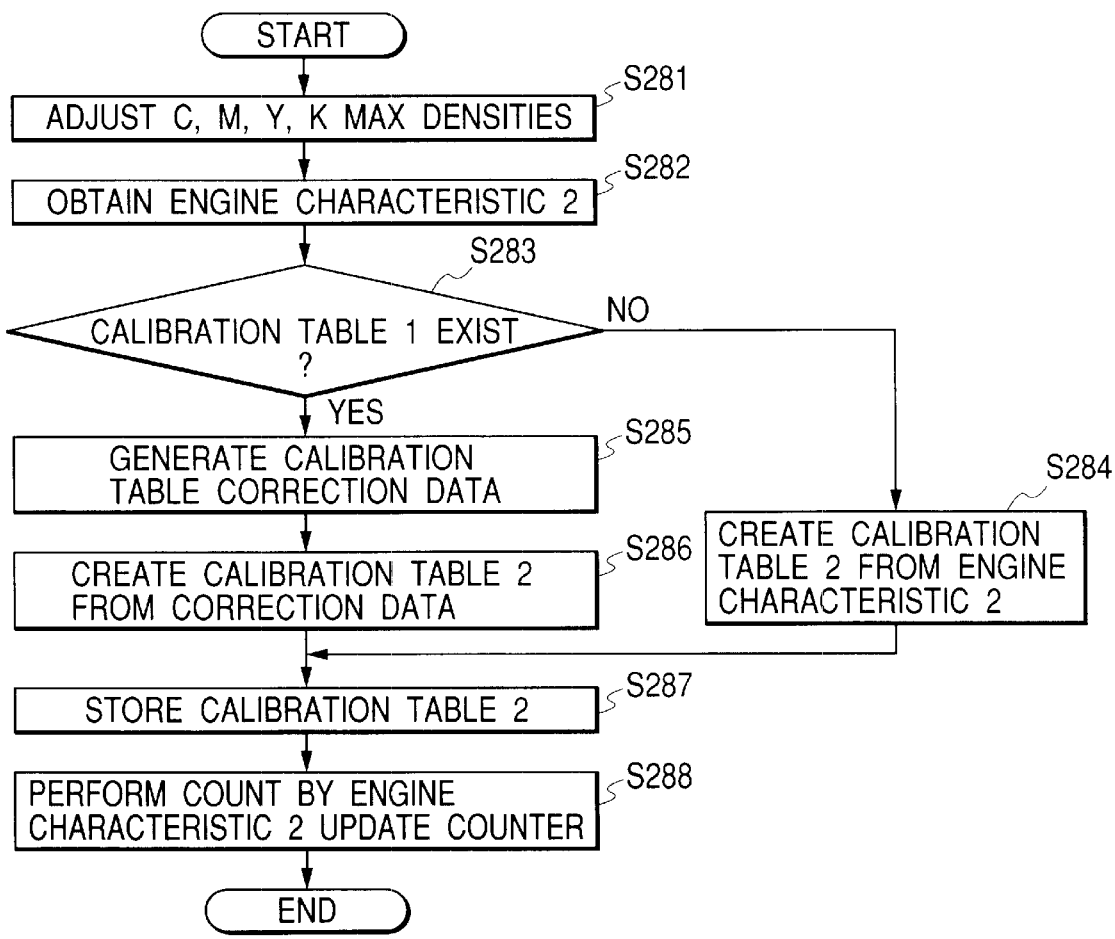
FIG. 28 is a flow chart showing a second printer calibration process according to the fifth embodiment.

FIGS. 27 and 28 are flow charts showing the calibration. Concretely, FIG. 27 is the flow chart showing the calibration performed between a computer and a color printer both included in the system. In this process, it is first instructed in a step S271 to output patch data from the server PC 1 to the printer 2, and thus the printer 2 outputs and prints the patch according to the sent patch data.

As an example of the patch data, the patch data shown in FIG. 6 is used.

In a step S272, engine characteristic information at the patch output time is obtained immediately after the patch data was output. Namely, by obtaining from the server PC 1 the second engine characteristic being the latest engine characteristic stored in the calibration data storage unit 21 of the printer 2, the engine characteristic information is obtained. A command system concerning data obtaining is not referred here.

In a step S272, the obtained second engine characteristic is stored as the first engine characteristic 111 in the calibration data storage unit 11 by the server PC 1. The first engine characteristic 111 is correlated, as the engine characteristic in case of outputting the patch data, with the later-described first calibration table. The details of the engine characteristic will be described later.

In a step S273, the output patch data is measured by the scanner 3. Namely, the scanner 3 inputs R, G and B signal values of each block of the patch data, and returns the values to the server PC 1. From the sent signal values, the server PC 1 calculates the average of the four blocks of the highlight block and the average of the eight blocks of the shadow block on the basis of the block arrangement of the patch data, and resultingly obtains 48-gradation R, G and B signal values for each of C, M, Y and K. Then, the server PC 1 obtains a 48-,gradation density signal from a 48-gradation luminance signal by using a previously prepared luminance/density conversion table (not shown) which shows the correspondence between R, G and B luminance signals of the scanner 3 and C, M, Y and K density signals of the printer 2.

Although it is not described in detail here, the scan is ordinarily performed through a scanner driver installed in the server PC 1. Further, scan resolution setting, input area designation, and the like are performed by the, scanner driver.

Next, in a step S274, the calibration table is created by the server PC 1.

In the step S274, the calibration table created by the server PC 1 is stored as the first calibration table 112 in the calibration data storage unit 11.

Next, in a step S275, the first engine characteristic 111 and the first calibration table 112 in the calibration data storage unit 11 are downloaded to the printer 2 by the server PC 1. At this time, time stamp information representing a time of download is also downloaded. Although a download command or the like at this time depends on a command system of the printer 2, this is not referred here.

The first engine characteristic 111, the first calibration table 112 and the time stamp information all downloaded are stored respectively as the first engine characteristic 211, the first calibration table 212 and the time stamp information 215 in the calibration data storage unit 21 through the printer controller 22.

Figure 29:
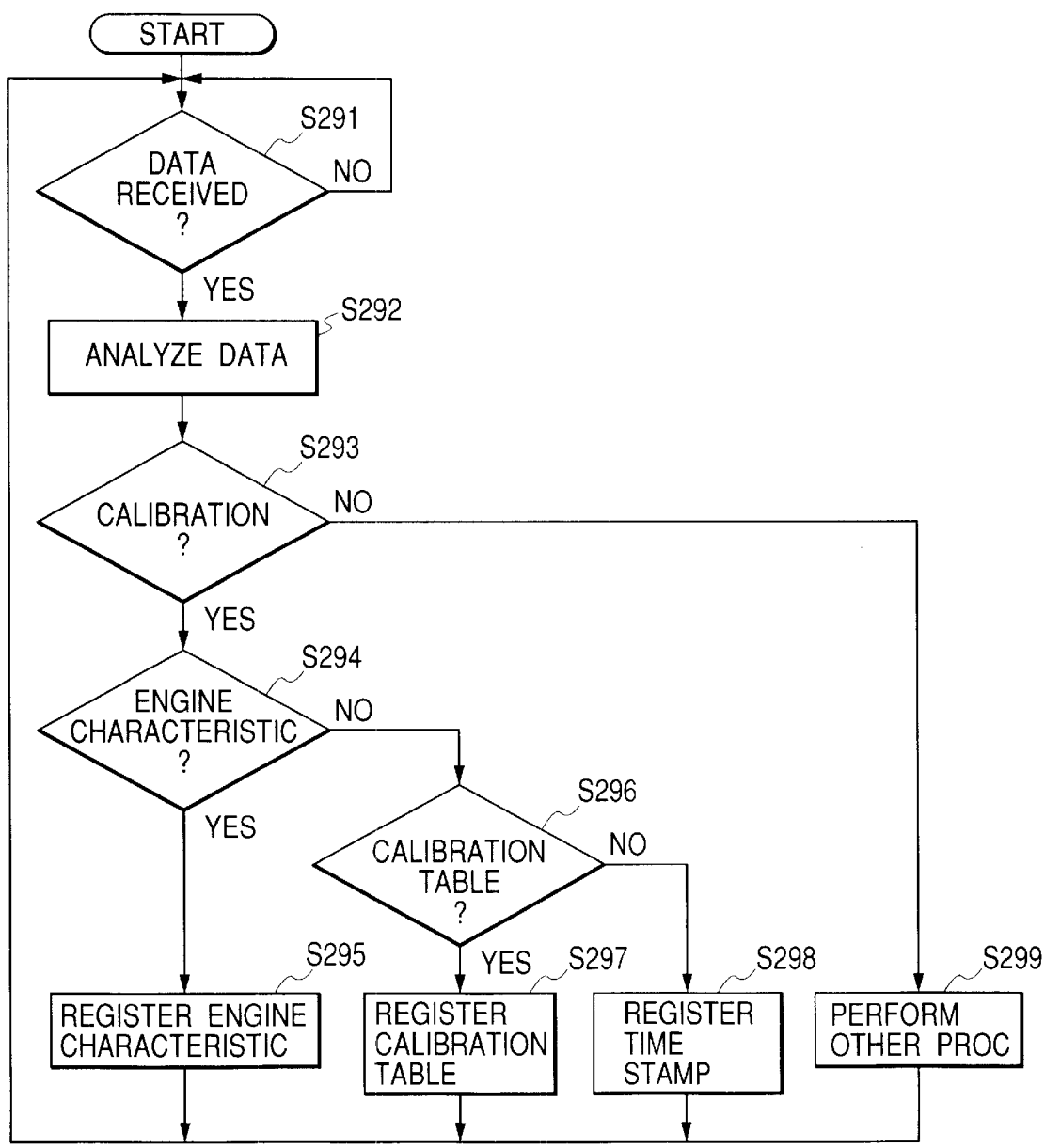
FIG. 29 is a flow chart showing a process in a case where a calibration data download command is received in a printer according to the fifth embodiment.

A process by the printer controller 22 in a case where the downloaded data is received by the printer 2 will be explained with reference to a flow chart shown in FIG. 29. In FIG. 29, it is judged in a step S291 whether or not the data is received. If judged that the data is not received, the process in the step S291 is repeated. Conversely, if judged that the data is received, the received data is analyzed in a step S292.

Then, it is judged in a step S293 whether or not the received data is a calibration download command. If judged that the received data is the calibration download command, it is further judged in a step S294 whether or not the data is engine characteristic data. If judged that the data is the engine characteristic data, the flow advances to a step S295 to register the first engine characteristic as the first engine characteristic 211 in the calibration data storage unit 21, as above.

Conversely, if judged in the step S294 that the data is not the engine characteristic data, it is judged in a step S296 whether or not the received data represents the calibration table. If judged that the data represents the calibration table, the flow advances to a step S297 to register the first calibration table as the first calibration table 212 in the calibration data storage unit 21, as above.

Further, if judged in the step S296 that the data does not represent the calibration table, such the data is judged to be the time stamp information, and the flow advances to a step S298 to register the time stamp information as the time stamp information 215 of the download of the first calibration table in the calibration data-storage unit 21, as above.

On the other hand, if judged in the step S293 that the received data is not the calibration download command, the flow advances to a step S299 to perform an appropriate process according to the judged result.

Ordinarily, printing data is flowed from the application on the client PC 4 to the printer 2 through the printer driver on the client PC 4. Thus, in the step S299 of FIG. 29 or the like, the printer controller 22 of the printer 2 performs printing data analyzing, page layout making, image editing, printing and the like.

As described above, the process by the client PC 4 includes a process in a PDL mode and a process in an image mode. In the PDL mode, rasterizing and binarizing are performed in the printer controller 22 of the printer 2, and R, G and B multivalue data are sent from the client PC 4 to the printer 2. On the other hand, in the image mode, image processes including the rasterizing and the binarizing are performed on the client PC 4, and C, M, Y and K binary data which are easy to be output by the printer engine 23 are sent to the printer 2. These processes are performed by using a PDL driver and an image driver, respectively.

Hereinafter, by using the PDL mode as an example, an operation flow in a case where the image process using the calibration data is performed by the PDL driver in the printer controller 22 will be explained with reference to FIGS. 30A and 31. Incidentally, an example of the image mode will be explained later.

Figure 30A:
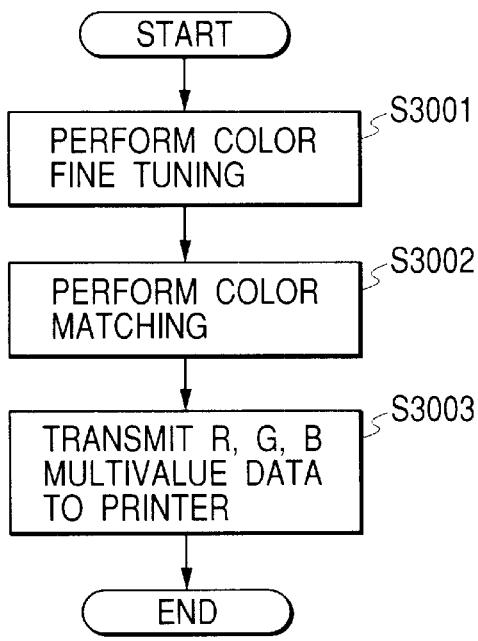
FIGS. 30A and 30B are flow charts showing an image process in a driver according to the fifth embodiment.

FIG. 30A is: the flow chart of the PDL driver process, and FIG. 31 is the flow chart of the controller process. First, in FIG. 30A, in a step S3001, color fine tuning is performed to the input R, G and B signals by the PDL driver on the client PC 4. Here, it should be noted that the color fine tuning includes processes such as luminance correction, contrast correction and the like.

Next, in a 'step S3002, a color matching process is performed to match a tint of a monitor and a tint of a printed result with each other. Although the data to be processed is the R, G and B multivalue signals at this time, in the PDL mode the data transmission is performed from the client PC 4 to the printer 2 in such a form (step S3003).

Next, in a step S3101 of FIG. 31, data analysis is performed by the-controller 22 in the printer 2. In this step, if it is judged that the data sent from the client PC 4 is PDL mode data, then a luminance/density conversion process is performed in a step S3102. The luminance/density conversion process is the process to convert the input R, G and B luminance signals into the C, M, Y and K density signals being the printing signals managed by the printer 2.

Next, in a step S3103, a calibration process is performed. Namely, in this process, an output characteristic is made linear by using eight-bit C, M, Y and K multivalue signals as input/output signals and using the second calibration table being the latest calibration table.

Next, in a step S3104, the eight-bit C, M, Y and K signals are converted into signals suitable for an output system. Generally, the eight-bit C, M, Y and K signals are binarized into one-bit C, M, Y and K signals. Thus, the appropriate output to which the calibration has been applied can be obtained in the printer system.

As above, the flow of the calibration to be performed between the computer and the color printer was explained. A color printing characteristic can be relatively stabilized by such the calibration. However, an engine characteristic has a tendency to easily change relatively if a drum temperature increases due to, e.g., continuous printing or the like. Thus, a user must frequently perform the calibration to always obtain a steady printed result only by the calibration. For this reason, in order to reduce a user's load and increase calibration accuracy, the present embodiment proposes that the device calibration is combined as follows.

FIG. 28 is the flow chart for explaining the calibration which is performed between the printer controller 22 and the printer engine 23 both constituting the color printer 2 in the present embodiment.

The device calibration is performed between the printer engine 23 and the printer controllers 22 on the basis of an event, as a trigger, with high possibility by which the engine characteristic changes. For example, this event includes a change in output of a not-shown temperature/humidity sensor provided in the printer engine 23, the number of printing, an exchange of the drum and a toner cartridge, and the like. It should be noted that, although other various matters can be considered to be included in this event, these matters are not referred here.

Here, as well as the above embodiments, in a step S281, a maximum density of each of C, M, Y and K is adjusted by the printer engine 23.

Next, in a step S282, the second engine characteristic being the latest engine characteristic is obtained. Concretely, in this step, sensor output values corresponding to plural intermediate densities are returned from the printer engine 23 to the printer controller 22 in response to a request from the printer controller 22.

Next, in a step S283, it is judged whether or not the first calibration table has been downloaded into the calibration data storage unit 21. If judged that the first calibration table is not yet downloaded, the flow advances to a step S284 to create the second calibration table in the'same manner as that in the conventional device calibration.

Conversely, if judged in the step S283 that the first calibration table has been downloaded into the calibration data storage unit 21, the flow advances to a step S285. In the step S285, such calibration table correction data as explained in the above embodiments is generated by the printer controller 22.

Next, in a step S286, the second calibration table stored in the calibration data storage unit 21 is updated by the printer controller 22. This process is performed by merging the calibration table correction data generated in the step S285 with the first calibration table stored in the calibration data storage unit 21.

In a step S287, the created second calibration table is stored in the calibration data storage unit 21.

Next, in a step S288, the number of updates of the second engine characteristic is counted up by the second engine characteristic update counter 216. Such information is used in the later-described image mode.

The created latest second calibration table is stored as the second calibration table 214 in the calibration data storage unit 21. The printer controller 22 performs the calibration process shown in the step S3103 of FIG. 31, always by using the second calibration table stored in the calibration data storage unit 21.

Next, by using the image mode as an example, an operation flow in a case where the image process using the calibration data is performed by the image driver in the printer controller 22 will be explained with reference to FIGS. 30B and 31.

Figure 30B:
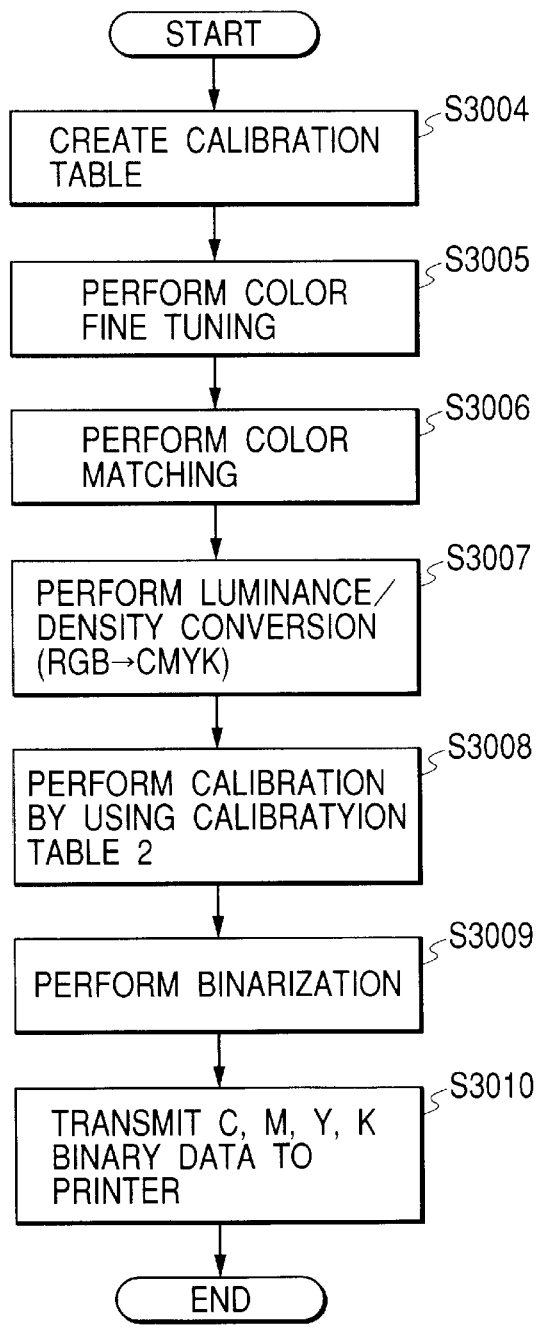

FIG. 30B is the flow chart of the image driver process. First, in FIG. 30B, in a step S3004, the calibration table is created by the image driver on the client PC 4.

Figure 32:
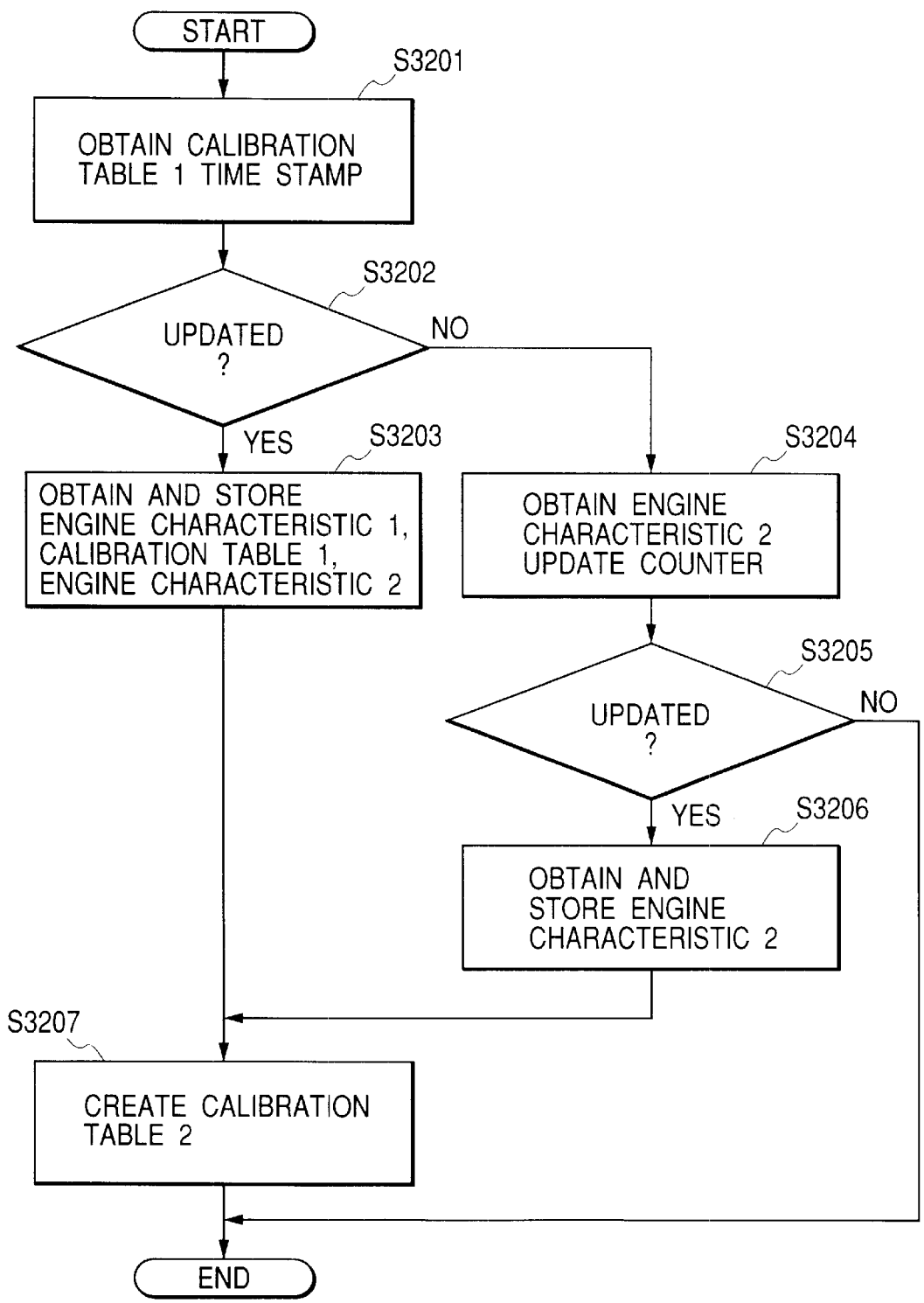
FIG. 32 is a flow chart showing a calibration data generation process in a client PC according to the fifth embodiment.

Such a state will be explained with reference to FIG. 32. In FIG. 32, a time stamp of the first calibration table is obtained in a step S3201. Concretely, the time stamp information 215 of the first calibration table in the calibration data storage unit 21 of the printer 2 is obtained by the information obtaining unit 431 of the client PC 4. A protocol or the like in case of obtaining the time stamp is not referred here.

Next, in a step S3202, the obtained time stamp is evaluated, i.e., it is judged whether or not such the time stamp has been updated. Although it is needless to say, the judged result is "YES" in a state that the first calibration table is never obtained. If "YES" in the step S3202, the flow advances to a step S3203. In this step, the first engine characteristic 211, the first calibration table 212 and the second engine characteristic 213 in the calibration data storage unit 21 of the printer 2 are obtained by the information obtaining unit 431. Then, in the calibration data storage unit 41 of the client PC 4, the first engine characteristic 211 is stored as the first engine characteristic 411, the first calibration table 212 is stored in the first calibration table 412, and the second engine characteristic 213 is stored as the second engine characteristic 413.

Next, in a step S3207, the second calibration table is created by using the first engine characteristic 411, the first calibration table 412 and the second engine characteristic 413. The operation is this case is the same as that in the PDL mode.

Namely, such a characteristic curve as shown by the characteristic curve 1 of FIG. 19 is first obtained by an approximation expression from the second engine characteristic 413 being the latest engine characteristic in the calibration data storage unit 41. Next, a characteristic curve is similarly obtained by an approximation expression from the first engine characteristic 411 being the engine characteristic at the soft calibration time. After then, as temporary calibration tables (data) for the respective characteristic curves, the tables are obtained from the inverse function curve such that the linear curve as shown in FIG. 4C can be obtained.

The calibration table correction data is generated by obtaining the difference between these two temporary calibration tables. Next, the latest second calibration table 414 is created and then stored by merging the generated calibration table correction data with the first calibration table 412 stored in the calibration data storage unit 41.

On the other hand, if "NO" in the step S3202 of FIG. 32, the flow advances to a step S3204 to obtain the second engine characteristic update counter. Namely, the second engine characteristic update counter 216 in the calibration data storage unit 21 of the printer 2 is obtained by the above information obtaining unit 431.

Next, in a step S3205, the value of the engine characteristic update counter is evaluated, i.e., it is judged whether or not such the value has been updated. Although it is needless to say, the judged result is "YES" in a state that the second engine characteristic is never obtained. As previously described, the engine characteristic update counter is the counter which is incremented every time the maximum density adjustment between the printer engine 23 and the printer controller 22 in the printer is performed and the second calibration table is thus updated by the printer controller 22.

Namely, the client PC 4 may judge whether or not calibration relation information should be obtained from the printer 2, according to whether or not the engine characteristic update counter has been incremented. Thus, since it is unnecessary to obtain the information in the case where the counter is not updated, it is possible to reduce a network graphic load.

If "YES" in the step S3205, the flow advances to a step S3206 to obtain the second engine characteristic 213 in the printer 2 by the information obtaining unit 431, and store the obtained second engine characteristic 213 as the second engine characteristic 413 in the calibration data storage unit 41 of the client PC 4.

Here, the second calibration data can be obtained directly from the printer 2 and used in the client PC 4. However, since the size of the calibration table (i.e., several tens kilobytes) is larger than that of the engine characteristic information (i.e., several tens bytes), the load to the network graphic increases when the second calibration table is frequently obtained. Thus, the method of obtaining the second engine characteristic information and creating the second calibration table on the side of the client PC 4 is adopted in the present embodiment.

Next, in the, step S3207, the second calibration table is created by using the first engine characteristic 411 and the first calibration table 412 previously obtained and stored in the calibration data storage unit 41, and the second engine characteristic 413 obtained in the step S3206. The operation is this case is the same as that in the PDL mode.

Next, in a step S3005 of FIG. 30B, color fine tuning is performed to the input R, G and B signals by the image driver, as well as the PDL driver, on the client PC 4. Next, in a step S3006, a color matching process is performed.

Next, in a step S3007, a luminance/density conversion process is performed by the image driver. The luminance/density conversion process is the process to convert the input R, G and B luminance signals into the C, M, Y and K density signals being the printing signals managed by the printer 2. Next, in a step S3008, a calibration process is performed. Namely, in this process, an output characteristic is made linear by using eight-bit C, M, Y and K multivalue signals as input/output signals and using the second calibration table 414 being the latest calibration table.

Next, in a step S3009, the eight-bit C, M, Y and K signals are converted into signals suitable for an output system. Generally, the eight-bit C, M, Y and K signals are binarized into one-bit C, M, Y and K signals. The data at this time is the C, M, Y and K binary signals, and in a next step S3010 data transmission from the client PC 4 to the printer 2 is performed based on such a form in the image mode.

Next, in the step S3101 of FIG. 31, the data analysis is performed by the controller 22 in the printer 2. In this step, if it is judged that the data sent from the client PC 4 is image mode data, then subsequent processes are skipped, the data transmitted from the client PC 4 is sent to the printer engine 23 as it is, and the printing is performed.

Thus, the appropriate output to which the calibration has been applied can be obtained even in the image mode of the printer system.

As described above, the flow of the calibration performed between the computer and the color printer has been explained with reference to FIG. 27. A color printing characteristic can be relatively stabilized by such the calibration.

An operation flow of a UI in the server PC 1 of the printer calibration system in the present embodiment is the same as that in the above embodiment (FIG. 8).

As described above, according to the present embodiment, the patch data is output from the color printer 2 in response to the instruction from the server PC 1, the first engine characteristic information at the time of outputting the patch data is obtained from the color printer 2, the obtained information is held and stored, and the patch data is read by the arbitrary scanner 3 on the side of the server PC 1.

Then, the first calibration table is created based on the read scan data on the server PC 1, and the created first calibration table, the first engine characteristic information and the time stamp information representing the download time are downloaded from the server PC 1 to the color printer 2.

Then, in the printer controller 22, the first calibration table 212, the first engine characteristic information 211 and the time stamp information 215 all downloaded from the server PC 1 are stored.

Further, in the printer engine 23, the maximum density of each of C, M, Y and K is corrected at arbitrary timing, and the second engine characteristic information 213 being the latest engine characteristic information is given in response to an inquiry from the printer controller 22 at the maximum density correction timing.

Then, in the printer controller 22, the second engine characteristic information 213 is stored, the second engine characteristic update counter 216 indicating the number of maximum density corrections is incremented, and the calibration table correction data is generated on the basis of the second engine characteristic information 213 and the first engine characteristic information 211 both stored.

Further, in the printer controller 22, the second calibration table 214 is created by using the calibration table correction data and the stored first calibration table 212, and the created second calibration table 214 is stored.

Then, in the PDL mode, the image process is performed by using the second calibration table 214, and the data subjected to the image process is sent to the printer engine 23, whereby the printing is performed.

Thus, it is possible to reduce a user's load and always perform steady color printing.

Further, in the image mode, the time stamp information 215 representing the download time of the first calibration table is obtained by the client PC 4.

It is judged based on the time stamp information 215 whether or not the first calibration table 212 has been updated. If judged that the first calibration table 212 has been updated, the first engine characteristic 211, the first calibration table 212 and the second engine characteristic 213 are obtained from the printer 2 to the client PC 4, and the second calibration table 414 is created based on the obtained data.

On the other hand, if judged that the first calibration table 212 is not yet updated, the second engine characteristic update counter 216 is obtained by the client PC 4, and it is judged based on this counter whether or not second engine characteristic 213 is updated. If judged that the second engine characteristic 213 is updated, the second engine characteristic 213 is obtained from the printer 2, and the second calibration table 414 is created from the first engine characteristic 411 and the first calibration table 412 previously obtained and stored and the obtained second engine characteristic 413.

In the image mode, the image process is performed based on the second calibration table 414 by the client PC 4, and the image data subjected to the image process is sent to the printer 2, whereby the printing is performed.

For this reason, without depending on each printing mode prepared in the printer system, it is possible to always perform color printing while suppressing network traffic as much as possible in any mode.

Sixth Embodiment

In the above fifth embodiment, the case where the second calibration table is created on the client computer was explained. In the sixth embodiment, a case where the second calibration table is obtained on the client computer will be explained.

Figure 33:
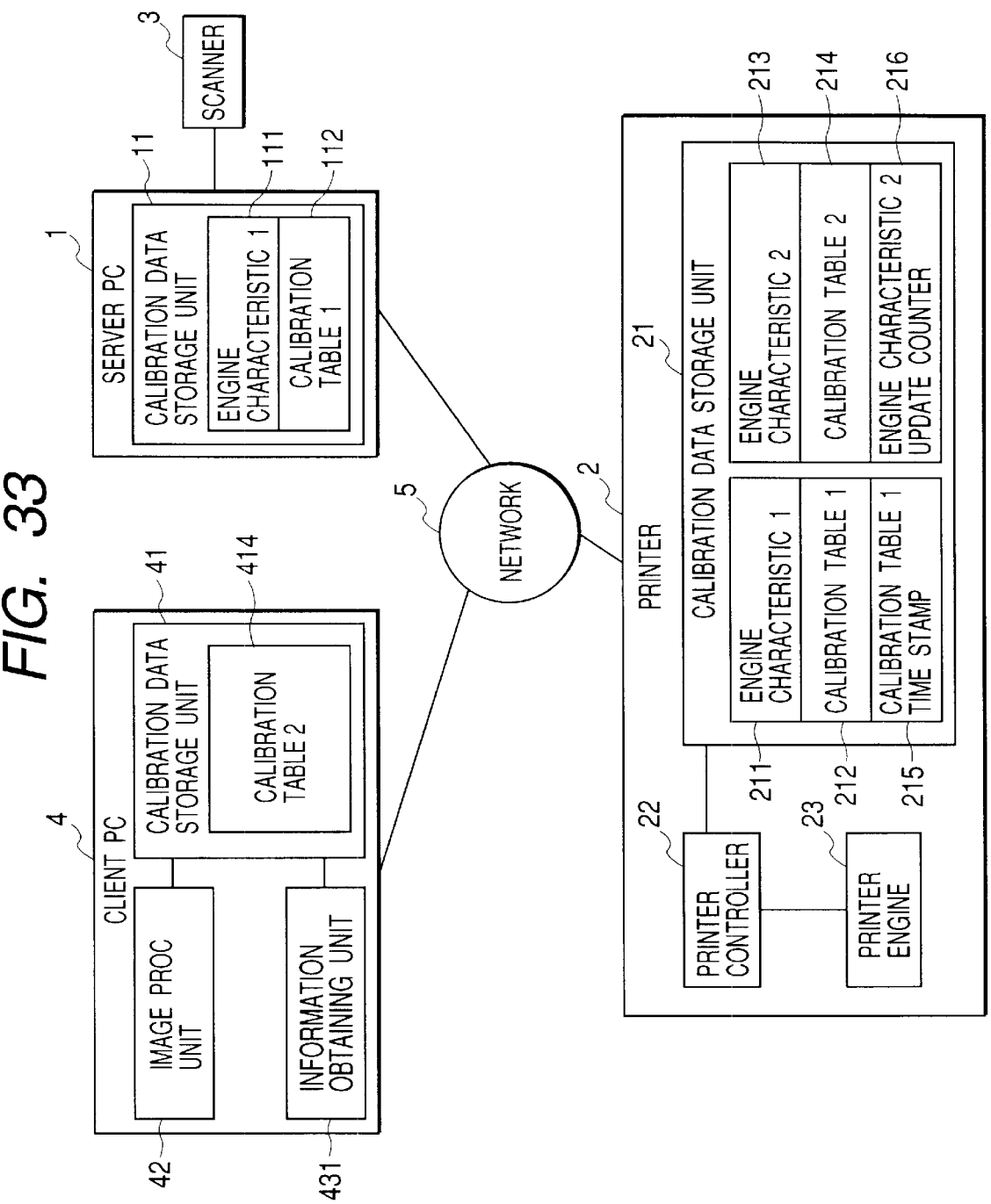
FIG. 33 is a block diagram showing an example of a structure of a printer calibration system according to the sixth embodiment.

FIG. 33 is a block diagram showing a structure of a printer calibration system according to the present embodiment. In FIG. 33, the same parts as in the structure shown in FIG. 26 are added with the same numerals as those shown in FIG. 26. Namely, numeral 1 denotes a server PC, and numeral 11 denotes a calibration data storage unit which holds and stores a first engine characteristic 111 and a first calibration table 112. Further, numeral 3 denotes a scanner, and numeral 5 denotes a network.

A calibration data storage unit 41 provided inside a client PC 4 is used to hold and store calibration data inside the client PC 4. Numeral 414 denotes a second calibration table which is the latest calibration table uploaded from a printer 2 and stored in the calibration data storage unit 41.

An image processing unit 42 provided inside the client PC 4 performs a later-described image process. Numeral 431 denotes an information obtaining unit which uploads the second calibration table from the printer 2, and stores the uploaded data in the calibration data storage unit 41.

A calibration process in the present embodiment is the same as that explained with reference to FIGS. 27 and 28, and a patch to be used is shown in FIG. 6. Further, an operation flow of a process by a printer controller 22 in a case where downloaded data is received by the printer 2 is the same as that explained with reference to FIG. 29. Further, an operation flow of a process in a case where an image process is performed by using a PDL driver in a PDL mode and calibration data in the printer controller 22 is the same as that explained in the fifth embodiment.

An operations flow of a process in a case where the image process is performed by using an image driver in an image mode and calibration data in the printer controller 22 will be explained.

The process by the image driver has been explained with reference to FIG. 30B. First, as explained in the step S3004 of FIG. 30B, the image driver on the client PC 4 obtains the calibration table.

Figure 34:
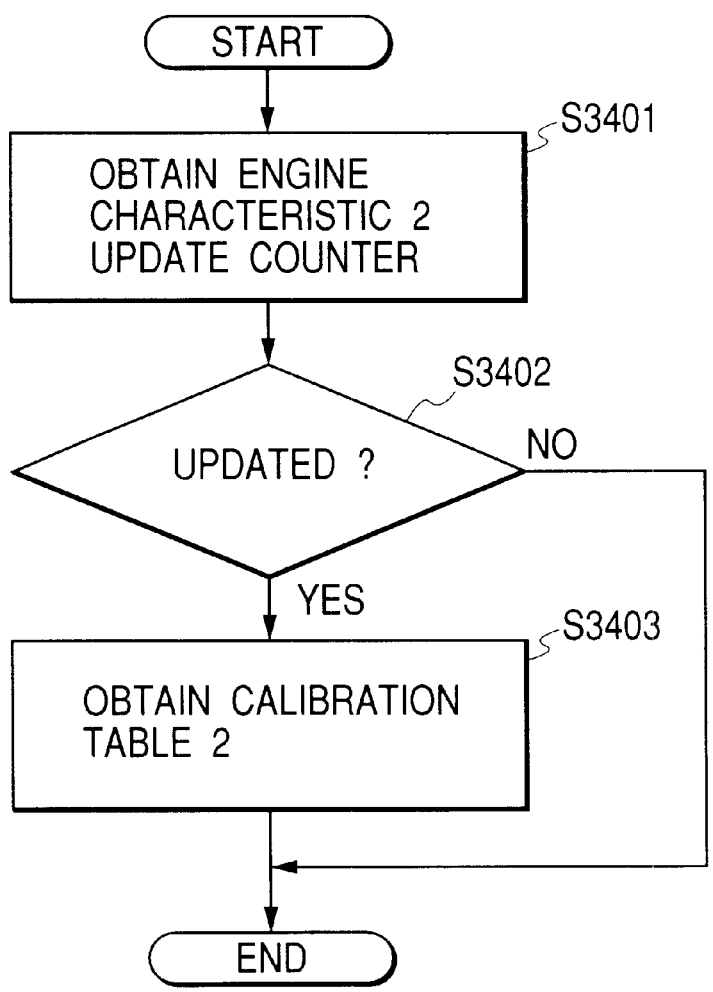
FIG. 34 is a flow chart showing a calibration data generation process in a client PC according to the sixth embodiment.

Such a state will be explained with reference to FIG. 34. First, in a step S3401, a second engine characteristic update counter is obtained. Concretely, a second engine characteristic update counter 216 in a second calibration data storage unit 21 of the printer 2 is obtained by the information obtaining unit 431. Besides, the calibration data storage unit 21 of the printer 2 holds and stores a first engine characteristic 211, a first calibration table 212, a second engine characteristic 213, a second calibration table 214, and first calibration table time stamp information.

Next, in a step S3402, the value of the engine characteristic update counter is evaluated, i.e., it is judged whether or not such the value has been updated. Although it is needless to say, the judged result is "YES" in a state that the second engine characteristic is never obtained. As previously described, the engine characteristic update counter is the counter which is incremented every time the maximum density adjustment between the printer engine 23 and the printer controller 22 is performed and the second calibration table is thus updated by the printer controller 22.

Namely, the client PC 4 may judge whether or not the second calibration table should be obtained from the printer 2, according to whether or not the engine characteristic update counter has been incremented. Thus, since it is unnecessary to obtain the information in the case where the counter is not updated, it is possible to reduce a network graphic load. If "YES" in the step S3402, the flow advances to a step S3403 to obtain the second calibration table. This process is the same as that already explained above.

The subsequent process of the image driver is the same as that explained with reference to FIG. 30B. As described above, by the calibration performed between the computer and the color printer, a color printing characteristic can be relatively stabilized.

Further, an operation flow of a UI in the server PC 1 of the printer calibration system in the present embodiment is the same as that in the above embodiment (FIG. 8).

As described above, according to the present embodiment, the patch data is output from the color printer 2 in response to the instruction from the server PC 1, the first engine characteristic information at the time of outputting the patch data is obtained from the color printer 2, the obtained information is held and stored, and the patch data is read by the arbitrary scanner 3 on the side of the server PC 1.

Then, the first calibration table is created based on the read scan data on the server PC 1, and the created first calibration table, the first engine characteristic information and the time stamp information representing the download time are downloaded from the server PC 1 to the color printer 2.

Then, in the printer controller 22, the first calibration table, the first engine characteristic information and the time stamp information concerning the first calibration table download all downloaded from the server PC 1 are stored.

Further, in,the printer engine 23, the maximum density of each of C, M, Y and K is corrected at arbitrary timing, and the second engine characteristic information being the latest engine characteristic information is given in response to an inquiry from the printer controller 22 at the maximum density correction timing.

Then, in the printer controller 22, the second engine characteristic information is stored. The second engine characteristic update counter indicating the number of maximum density corrections is incremented by the printer controller 22. Further, the calibration table correction data is generated by the printer controller 22 on the basis of the second engine characteristic information 213 and the first engine characteristic information 211 both stored.

Further, in the printer controller 22, the second calibration table 214 is created by using the calibration table correction data and the stored first calibration table 212, and the created second calibration table 214 is stored.

Then, in the; PDL mode, the image process is performed by using the above second calibration table, and the data subjected to the image process is sent to the printer engine 23, whereby the printing is performed.

Thus, it is possible to reduce a user's load and always perform steady color printing.

Further, in the image mode, an update counter of the second engine characteristic is obtained by the client PC 4. It is judged based on the update counter whether or not the second engine characteristic has been updated. If judged that the second engine characteristic has been updated, the second calibration table is obtained. In the image mode, the image process is performed based on the second calibration table by the client PC 4, and the image data subjected to the image process is sent to the printer 2, whereby the printing is performed.

For this reason, without depending on each printing mode prepared in the printer system, it is possible to always perform color printing while suppressing network traffic as much as possible in any mode.

The present invention is applicable to a system composed of plural equipments or to an apparatus including a single equipment. Further, it is needless to say that the present invention is applicable to a case where the functions of the above embodiments can be achieved by supplying programs to the system or the apparatus. In this case, a storage medium which stores the programs concerning the present invention constitutes the present invention. Then, in a case where the programs are read from the storage medium to the system or the apparatus, such system or the apparatus operates in a predetermined method.

The present invention is not limited to the above embodiments, and:various modifications and changes are possible in the present invention without departing from the spirit and scope of the appended claims.

What is claimed is:

1. A method of controlling an image processing condition in a system that includes an image recording apparatus and a server apparatus, comprising:

a first step of causing the server apparatus to perform a first calibration that inputs a first test image formed on a recording sheet by the image recording apparatus and determines an image processing condition of the image recording apparatus based on a density of the inputted first test image;

a second step of causing the image recording apparatus to perform a second calibration that automatically forms a second test image based on a predetermined condition, measures a density of the formed second test image, and determines an image processing condition based on the measured density;

a third step of causing the image recording apparatus to receive the image processing condition determined in the first calibration from the server apparatus, and storing an engine characteristic in a memory in association with the received image processing condition, wherein the engine characteristic is a characteristic of density held by the image recording apparatus when the first calibration is performed; and a fourth step of, when the second calibration is performed and in a case where the image processing condition is stored in the memory, causing the image recording apparatus to correct the image processing condition stored in the memory, based on the engine characteristic stored in association with the image processing condition and an engine characteristic measured in the second calibration.

2. A method according to claim 1, wherein, in said first step, the first test image formed on the recording sheet is read by a scanner apparatus, and a density conversion table is created based on the density of the read first test image.

3. A method according to claim 1, wherein, in said second step, the engine characteristic is measured based on the measured density of the second test image, and the measured engine characteristic is stored.

4. An image processing method, which creates an image processing condition according to an output characteristic of an image output apparatus, and which performs an image process on an inputted image using the created image processing condition, said method comprising:

a creation step of causing the image output apparatus to form a patch on a recording medium, and creating and storing an image processing condition based on data obtained by reading the formed patch;

a measurement step of automatically measuring the formed patch, based on a predetermined condition in the image output apparatus; and a correction step of correcting the stored image processing condition, based on a measurement result of the formed patch measured in said measurement step, wherein the image processing condition is stored in a nonvolatile storage unit, and the image processing condition corrected in said correction step is stored in a temporary storage unit.

5. A method according to claim 4, wherein the image processing condition is stored not only in the nonvolatile storage unit but also is stored in the temporary storage unit, and the image processing condition stored in the nonvolatile storage unit is used as a backup.

6. A printer calibration system comprising:
a printer that includes a controller and a printing unit; and
a server system,
wherein said printer and said server system are connected to a network,
wherein said server system comprises:
output means arranged to instruct said printer to output patch data;
first engine information obtaining means arranged to obtain, from said printer, characteristic information of an engine immediately after the patch data is outputted, as first engine characteristic information;
first calibration data generation means arranged to capture by a scanner the patch data outputted from said printer, and generate first calibration data based on the captured patch data; and
download means arranged to download the first calibration data, generated by the first calibration data generation means, and the first engine characteristic information, obtained by the first engine information obtaining means, to said printer,
wherein said printer comprises:
second engine information obtaining means arranged to cause the controller to obtain, from the engine, latest characteristic information of the engine, as second engine characteristic information; and
second calibration data generation means arranged to cause the controller to generate second calibration data, based on a state of a download, using at least the second engine characteristic information, and
wherein, in a printing mode based on a page description language, the controller performs an image process using the second calibration data and sends data that has been processed by the image process to the engine, and the printing unit performs printing based on the sent data.

7. A system according to claim 6, wherein, when the download is performed, the second calibration data generation means generates the second calibration data using the first calibration data, the first engine characteristic information, and the second engine characteristic information.

8. A system according to claim 6, wherein, when the download is not performed, the second calibration data generation means generates the second calibration data using only the second engine characteristic information.

9. A system according to claim 6, further comprising a client system connected to the network,
wherein said client system comprises:
update information obtaining means arranged to obtain update information from said printer; and
client calibration data generation means arranged to obtain information from said printer, based on the update information obtained by the update information obtaining means, and generate the second calibration data, and
wherein, in an image mode in which said client system expands page description language data into image data, said client system performs an image process using the second calibration data generated by the client calibration data generation means and sends data that has been processed by the image process to said printer, and the printing unit performs printing based on the sent data.

10. A system according to claim 9, wherein, when it is judged based on the obtained update information that the download has been performed, said client calibration data generation means obtains data that includes the first calibration data, the first engine characteristic information, and the second engine characteristic information from said printer, and generates the second calibration data using the obtained data.

11. A system according to claim 9, wherein
said printer comprises counter update means arranged to cause the controller to update a counter in accordance with a number of times that the second engine characteristic information of the second engine information obtaining means is obtained,
when it is judged based on the obtained update information that the download has not been performed, the client calibration data generation means obtains a value of the counter from said printer, and
when it is judged based on the obtained value of the counter that the counter has been updated, the client calibration data generation means obtains the second engine characteristic information from said printer, and generates the second calibration data using the obtained second engine characteristic information.

12. A system according to claim 6,
wherein said printer comprises counter update means arranged to cause the controller to update a counter in accordance with a number of times that the second engine characteristic information of the second engine information obtaining means is obtained,
wherein said system further comprises a client system that includes:
counter obtaining means arranged to obtain a value of the counter from said printer; and
client calibration data obtaining means arranged to obtain the second calibration data from said printer, when it is judged based on the value of the counter obtained by the counter obtaining means that the counter has been updated, and
wherein, in an image mode in which said client system expands page description language data into image data, said client system performs an image process using the second calibration data obtained by the client calibration data obtaining means and sends data that has been processed by the image process to said printer, and the printing unit performs printing based on the sent data.

13. A printer calibration method for a printer calibration system that comprises a printer that includes a controller and a printing unit and a server system, the printer and the server system being connected to a network,
wherein said method at the server system comprises:
an output step of instructing the printer to output patch data;
a first engine information obtaining step of obtaining, from the printer, characteristic information of an engine immediately after the patch data is outputted, as first engine characteristic information;
a first calibration data generation step of capturing through a scanner the patch data outputted from the printer, and generating first calibration data based on the captured patch data; and
a download step of downloading the first calibration data, generated in said first calibration data generation step, and the first engine characteristic information, obtained in said first engine information obtaining step, to the printer, wherein said method at the printer comprises:
- a second engine information obtaining step of causing the controller to obtain from the engine latest characteristic information of the engine, as second engine characteristic information; and
- a second calibration data generation step of causing the controller to generate second calibration data based on a state of a download, using at least the second engine characteristic information, and wherein, in a printing mode based on a page description language, the controller performs an image process using the second calibration data and sends data that has been processed by the image process to the engine, and the printing unit performs printing based on the sent data.

14. A method according to claim 13, wherein, when the download is performed, said second calibration data generation step generates the second calibration data using the first calibration data, the first engine characteristic information, and the second engine characteristic information.

15. A method according to claim 13, wherein, when the download is not performed, said second calibration data generation step generates the second calibration data using only the second engine characteristic information.

16. A method according to claim 13,
wherein the printer calibration system further comprises a client system connected to the network, wherein said method at the client system comprises:
- an update information obtaining step of obtaining update information from the printer; and
- a client calibration data generation step of obtaining information from the, printer based on the update information obtained in said update information obtaining step, and generating the second calibration data, and wherein, in an image mode, the client system performs an image process using the second calibration data generated in said client calibration data generation step and sends data that has been processed by the image process to the printer, the printing unit performs printing based on the sent data.

17. A method according to claim 16, wherein, when it is judged based on the obtained update information that the download has been performed, said client calibration data generation step obtains data that includes the first calibration data, the first engine characteristic information, and the second engine characteristic information from the printer, and generates the second calibration data by using the obtained data.

18. A method according to claim 16, wherein
said method further comprises, at the printer, a counter update step of causing the controller to update a counter in accordance with a number of times that the second engine characteristic information is obtained in said second engine information obtaining step,
when it is judged based on the obtained update information that the download has not been performed, said client calibration data generation step obtains a value of the counter from the printer, and
when it is judged based on the obtained value of the counter that the counter has been updated, said client calibration data generation step obtains the second engine characteristic information from the printer, and generates the second calibration data using the obtained second engine characteristic information.

19. A method according to claim 13,
wherein the printer calibration system includes a client system is connected to the network,
wherein said method at the printer comprises a counter update step of causing the controller to update a counter in accordance with a number of times that the second engine characteristic information is obtained in said second engine information obtaining step,
wherein said method at the client system comprises:
- a counter obtaining step of obtaining a value of the counter from the printer; and
- a client calibration data obtaining step of obtaining the second calibration data from the printer, when it is judged, based on the value of the counter obtained in said counter obtaining step, that the counter has been updated, and wherein, in an image mode in which the client system expands page description language data into image data, the client system performs an image process using the second calibration data obtained in said client calibration data obtaining step and sends data that has been processed by the image process to the printer, and the printing unit performs printing based on the sent data.

20. A computer-readable storage medium storing a program for implementing a printer calibration method in a printer calibration system comprising a printer that includes a controller and a printer and a server system, the printer and the server system being connected to a network, wherein the program comprises:
a module for causing the server system to execute:
- an output step of instructing the printer to output patch data,
- a first engine information obtaining step of obtaining, from the printer, characteristic information of an engine immediately after the patch data is outputted, as first engine characteristic information,
- a first calibration data generation step of capturing through a scanner the patch data outputted from the printer, and generating first calibration data based on the captured patch data, and
- a download step of downloading the first calibration data, generated in said first calibration data generation step, and the first engine characteristic information, obtained in said first engine information obtaining step, to the printer; and a module for causing the printer to execute:
- a second engine information obtaining step of obtaining latest characteristic information of the engine as second engine characteristic information, from the engine,
- a second calibration data generation step of causing the controller to generate second calibration data based on a state of a download, using at least the second engine characteristic information, and
- a printing step of, in a printing mode based on a page description language, causing the controller to perform an image process using the second calibration data and sending data that has been processed by the image process to the engine, so as to perform printing.

21. A printer calibration apparatus in which a controller is caused to obtain latest characteristic information of an engine from the engine, and in which a printer is controlled to generate calibration data, said apparatus comprising:
output means arranged to instruct the printer to output patch data;

first engine information obtaining means arranged to obtain, from the printer, characteristic information of the engine immediately after the patch data is outputted, as first engine characteristic information;

first calibration data generation means arranged to capture by a scanner the patch data outputted from the printer, and generate first calibration data based on the captured patch data; and download means arranged to download the first calibration data, generated by said first calibration data generation means, and the first engine characteristic information, obtained by said first engine information obtaining means, to the printer so as to cause the printer to generate second calibration data, wherein, in a case in which the printer is to perform printing based on a page description language, the controller is caused to perform an image process using the second calibration data and send data that has been processed by the image process to the engine, so as to perform printing.

22. A printer calibration method for a printer calibration apparatus in which a controller is caused to obtain latest characteristic information of an engine from the engine, and in which a printer is controlled to generate calibration data, said method comprising:

an output step of instructing the printer to output patch data;

a first engine information obtaining step of obtaining, from the printer, characteristic information of the engine immediately after the patch data is outputted, as first engine characteristic information;

a first calibration data generation step of capturing by a scanner the patch data outputted from the printer, and generating first calibration data based on the captured patch data; and a download step of downloading, to the printer, the first calibration data generated in said first calibration data generation step and the first engine characteristic information obtained in said first engine information obtaining step, so as to cause the printer to generate second calibration data, wherein, in a case in which the printer is to perform printing based on a page description language, the controller is caused to perform an image process using the second calibration data and send data that has been processed by the image process to the engine, so as to perform printing.

23. A computer-readable storage medium storing a program for implementing a printer calibration method, in which a controller is caused to obtain latest characteristic information of an engine from the engine, and in which a printer is controlled to generate calibration data, wherein the method comprises:

an output step of instructing the printer to output patch data;

a first engine information obtaining step of obtaining, from the printer, characteristic information of the engine immediately after the patch data is outputted, as first engine characteristic information;

a first calibration data generation step of capturing by a scanner the patch data outputted from the printer, and generating first calibration data based on the captured patch data; and a download step of downloading, to the printer, the first calibration data generated in said first calibration data generation step and the first engine characteristic information obtained in said first engine information obtaining step, so as to cause the printer to generate second calibration data, wherein, in a case in which the printer is to perform printing based on a page description language, the controller is caused to perform an image process using the second calibration data and send data that has been processed by the image process to the engine, so as to perform printing.

* * * * *

UNITED STATES PATENT AND TRADEMARK OFFICE
CERTIFICATE OF CORRECTION

PATENT NO.    : 6,616,262 B2
DATED         : September 9, 2003
INVENTOR(S)   : Nobuyuki Nakajima et al.

Figure 23:
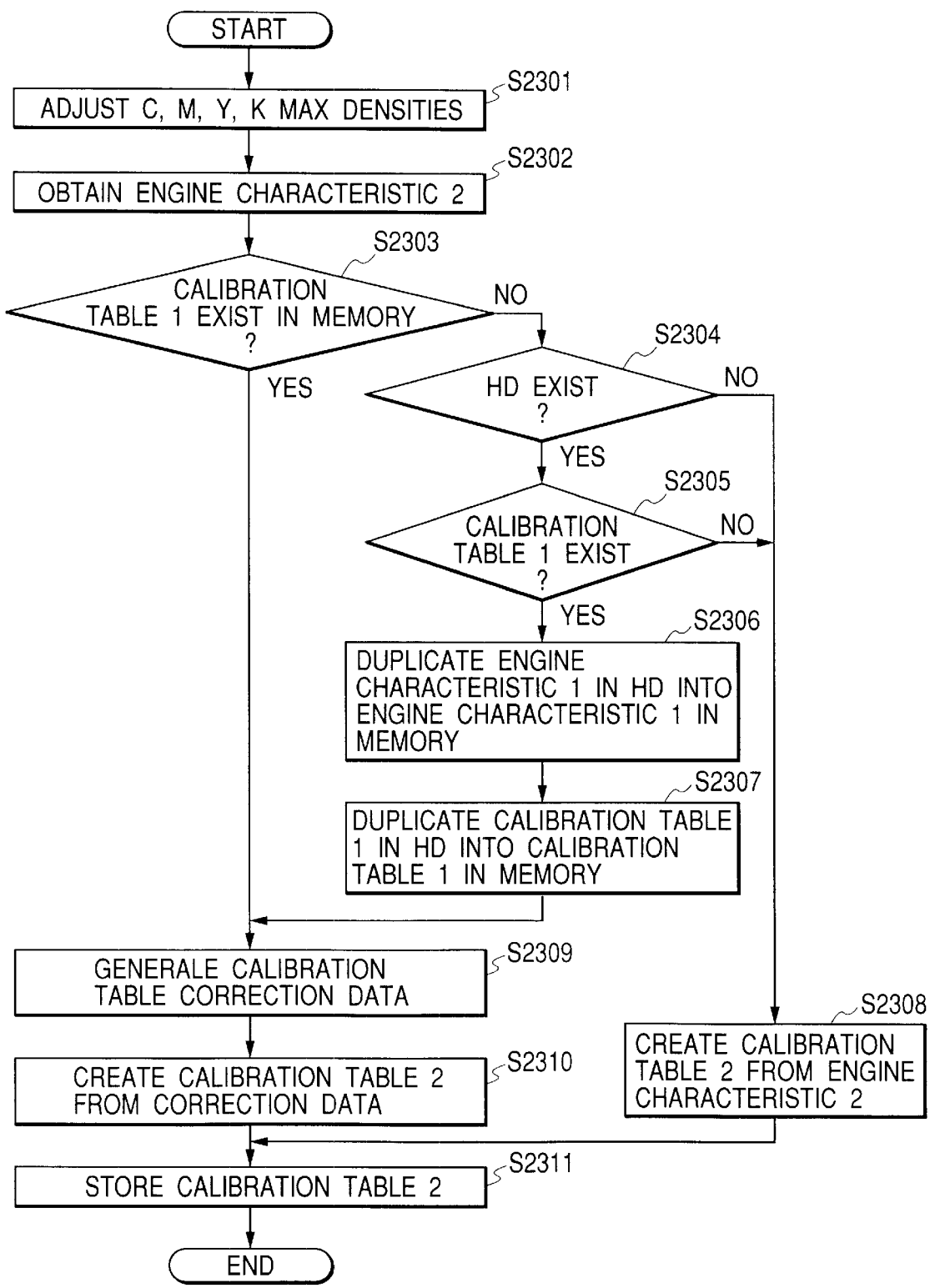
FIG. 23 is a flow chart showing a second printer calibration process according to the fourth embodiment.

It is certified that error appears in the above-identified patent and that said Letters Patent is hereby corrected as shown below:

Drawings,
Sheet 21, Fig. 23, "GENERALE" should read -- GENERATE --.
Sheet 28, Fig. 31, "BINARYZATION" should read -- BINARIZATION --.

Column 1,
Line 16, "reminder" should read -- remainder --.
Line 30, "that" should read -- by which --.
Line 60, "like which the" should read -- like, which --.

Column 2,
Line 29, "is-necessary" should read -- is necessary --.
Line 33, "that" should read -- in which --.

Column 4,
Line 38, "a:" should read -- a --.

Column 5,
Line 6, "engine: information" should read -- engine information --.
Line 9, "-the" should read -- the --.

Column 6,
Line 24, "ion" should read -- on --.

Column 7,
Line 52, "to! advance" should read -- to advance --.

Column 8,
Line 40, "of, the" should read -- of the --.

Column 10,
Line 37, "in.a" should read -- in a --.

Column 11,
Line 29, "Converted" should read -- converted --.

UNITED STATES PATENT AND TRADEMARK OFFICE
CERTIFICATE OF CORRECTION

PATENT NO.      : 6,616,262 B2
DATED            : September 9, 2003
INVENTOR(S)   : Nobuyuki Nakajima et al.

It is certified that error appears in the above-identified patent and that said Letters Patent is hereby corrected as shown below:

Column 12,
Line 16, "density, value" should read -- density value --.

Column 15,
Line 27, "are added with" should read -- are labeled by --.
Line 61, "sort" should read -- first --.

Column 16,
Line 16, "as,in" should read -- as in --.
Line 17, "added" should read -- identified --.
Line 24, "ILL-i" should be deleted.
Line 51, "data,storage" should read -- data storage --.

Column 17,
Line 59, "added" should read -- identified --.

Column 18,
Line 59, "thought" should read -- have --.

Column 19,
Line 54, "48-, gradation" should read -- 48-gradation --.
Line 63, "the," should read -- the --.

Column 21,
Line 14, "'step" should read -- step --.
Line 21, "the-controller" should read -- the controller --.

Column 25,
Line 12, "the:" should read -- the --.
Line 59, "added" should read -- identified --.

UNITED STATES PATENT AND TRADEMARK OFFICE
CERTIFICATE OF CORRECTION

PATENT NO. : 6,616,262 B2
DATED : September 9, 2003
INVENTOR(S) : Nobuyuki Nakajima et al.

It is certified that error appears in the above-identified patent and that said Letters Patent is hereby corrected as shown below:

<u>Column 31,</u>
Line 33, "the," should read -- the --.

<u>Column 32,</u>
Line 3, "is" should read -- that is --.

Signed and Sealed this

Eleventh Day of May, 2004

JON W. DUDAS
*Acting Director of the United States Patent and Trademark Office*